(12) United States Patent
Hirano et al.

(10) Patent No.: US 12,216,787 B2
(45) Date of Patent: Feb. 4, 2025

(54) SEARCHABLE ENCRYPTION SYSTEM, SEARCHABLE ENCRYPTION METHOD, AND NON-TRANSITORY COMPUTER-READABLE RECORDING MEDIUM

(71) Applicant: Mitsubishi Electric Corporation, Tokyo (JP)

(72) Inventors: Takato Hirano, Tokyo (JP); Yutaka Kawai, Tokyo (JP); Yoshihiro Koseki, Tokyo (JP); Satoshi Yasuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 346 days.

(21) Appl. No.: 17/742,179

(22) Filed: May 11, 2022

(65) Prior Publication Data

US 2022/0277100 A1    Sep. 1, 2022

Related U.S. Application Data

(63) Continuation of application No. PCT/JP2020/000845, filed on Jan. 14, 2020.

(51) Int. Cl.
*G06F 21/62* (2013.01)
(52) U.S. Cl.
CPC .................. *G06F 21/6227* (2013.01)
(58) Field of Classification Search
None
See application file for complete search history.

(56) References Cited

U.S. PATENT DOCUMENTS

2009/0300351 A1*  12/2009  Lei ..................... G06F 16/986
                                                707/999.005
2016/0299924 A1   10/2016  Fujimoto et al.
(Continued)

FOREIGN PATENT DOCUMENTS

EP    3 096 245 A1    11/2016
EP    3 657 475 A1     5/2020
(Continued)

OTHER PUBLICATIONS

Office Action dated Feb. 1, 2023 issued in corresponding German Application No. 112020005626.0 with English Translation.
(Continued)

*Primary Examiner* — Philip J Chea
*Assistant Examiner* — James Ross Hollister
(74) *Attorney, Agent, or Firm* — Birch, Stewart, Kolasch & Birch, LLP

(57) ABSTRACT

A searchable encryption system includes a registration device including an index generation unit (624) and an encrypted index generation unit (625). The index generation unit (624) generates a registration keyword index by using a registration keyword, authorized-person attribute information corresponding to an authorized person who has an authority to search for the registration keyword, a user key function to generate a user key corresponding to a searcher, a search query function to generate a search query having the user key incorporated therein, and an index query function to generate an index query having the search query incorporated therein. The encrypted index generation unit (625) generates an encrypted index by encrypting the registration keyword index by using the index disclosure key.

19 Claims, 33 Drawing Sheets

(56) References Cited

U.S. PATENT DOCUMENTS

| | | | |
|---|---|---|---|
| 2016/0335450 A1* | 11/2016 | Yoshino | G06F 16/334 |
| 2017/0026350 A1* | 1/2017 | Dawoud | H04L 63/067 |
| 2018/0365433 A1* | 12/2018 | Hayasaka | H04L 9/0861 |
| 2020/0351081 A1 | 11/2020 | Hirano et al. | |
| 2020/0412536 A1 | 12/2020 | Hirano et al. | |
| 2021/0081562 A1 | 3/2021 | Hirano et al. | |
| 2022/0329416 A1* | 10/2022 | Larmuseau | H04L 9/085 |

FOREIGN PATENT DOCUMENTS

| | | |
|---|---|---|
| EP | 3 696 797 A1 | 8/2020 |
| JP | 2010-61103 A | 3/2010 |
| JP | 2015-135541 A | 7/2015 |
| JP | 2016-200938 A | 12/2016 |
| WO | WO 2015/108052 A1 | 7/2015 |
| WO | WO 2019/053788 A1 | 3/2019 |
| WO | WO 2019/142268 A1 | 7/2019 |
| WO | WO 2019/142651 A1 | 7/2019 |
| WO | WO 2019/215818 A1 | 11/2019 |

OTHER PUBLICATIONS

International Search Report for PCT/JP2020/000845 (PCT/ISA/210) mailed on Mar. 24, 2020.

\* cited by examiner

Fig. 19

| NUMBER | ATTRIBUTE INFORMATION | | | |
|---|---|---|---|---|
| | FIRST ATTRIBUTE (DIVISION) | SECOND ATTRIBUTE (DEPARTMENT) | THIRD ATTRIBUTE (SECTION) | FOURTH ATTRIBUTE (NAME) |
| 1 | Di | De | Sc | Ne |
| 2 | Di | De | Sd | Nf |
| 3 | Di | De | Sc | * |
| 4 | Di | De | * | * |
| ⋮ | ⋮ | ⋮ | ⋮ | ⋮ |

Fig.21

| FILE NAME | CIPHERTEXT DATA | ENCRYPTED TAG | ENCRYPTED INDEX | INDEX |
|---|---|---|---|---|
| File (M1) | C1 | CT_{TOKYO} | EI1_1, EI1_2, EI1_3 | Null |
| File (M2) | C2 | CT_{OSAKA} | EI2_1, EI2_2, EI2_3 | Null |
| File (M3) | C3 | CT_{AICHI} | EI3_1, EI3_2, EI3_3 | Null |
| ⋮ | ⋮ | ⋮ | ⋮ | ⋮ |

| FILE NAME | CIPHERTEXT DATA | ENCRYPTED TAG | ENCRYPTED INDEX | INDEX |
|---|---|---|---|---|
| File (M1) | C1 | CT_{TOKYO} | EI1_2, EI1_3 | I1_1 |
| File (M2) | C2 | CT_{OSAKA} | EI2_2, EI2_3 | I2_1 |
| File (M3) | C3 | CT_{AICHI} | EI3_2, EI3_3 | I3_1 |
| ⋮ | ⋮ | ⋮ | ⋮ | ⋮ |

893

SEARCHABLE ENCRYPTION SYSTEM, SEARCHABLE ENCRYPTION METHOD, AND NON-TRANSITORY COMPUTER-READABLE RECORDING MEDIUM

CROSS REFERENCE TO RELATED APPLICATION

This application is a Continuation of PCT International Application No. PCT/JP2020/000845, filed on Jan. 14, 2020, which is hereby expressly incorporated by reference into the present application.

TECHNICAL FIELD

The present disclosure relates to a searchable encryption system, searchable encryption method, and searchable encryption program.

BACKGROUND ART

The searchable encryption is a technique of searching for encrypted data as encrypted. That is, the searchable encryption is a technique of searching for encrypted data without decoding.

In recent years, the searchable encryption attracts attention in cloud services as a security technique for protecting classified information. According to the searchable encryption, it is possible to prevent interception of classified information by a server administrator, malware, or the like. That is, the searchable encryption attracts attention as a security technique for safely managing data on the Internet.

The searchable encryption has two types: a common key scheme and a public key scheme.

In the common key scheme, common key cryptography is used, and registers and searchers are limited.

In the public key scheme, public key cryptography is used, and searchers are limited but registers are not limited.

Patent Literature 1 discloses a multiuser-type common key scheme. In this scheme, a register encrypts data by using a registration-purpose secret key that is different for each searcher.

CITATION LIST

Patent Literature

Patent Literature 1: WO 2019/142651 A1

SUMMARY OF INVENTION

Technical Problem

When the common key scheme disclosed in Patent Literature 1 is used, time required for searching for encrypted data depends on the number of encrypted tags registered in a data management device. Moreover, in this case, it is impossible to configure an index that can be utilized to increase the speed of searching. Thus, there is a problem that it is impossible to search for encrypted data at high speeds when the number of registered encrypted tags is large.

An object of the present disclosure is to allow, in a searchable encryption system adopting a multiuser-type common key scheme, a searcher to search for data registered in a data management device at relatively high speeds.

Solution to Problem

A searchable encryption system according to the present invention includes:
a registration device including
a registration data storage unit to store a registration keyword, authorized-person attribute information indicating an attribute to be owned by an authorized person who has an authority to search for the registration keyword, and an index disclosure key to encrypt a registration keyword index corresponding to the registration keyword,
an index generation unit to generate the registration keyword index by using the registration keyword, the authorized-person attribute information, a user key function to generate a user key having incorporated therein searcher attribute information indicating an attribute that a searcher who searches for the registration keyword has, a search query function to generate a search query having the user key incorporated therein, the search query corresponding to a search keyword for the searcher to search for the registration keyword, and an index query function to generate an index query having the search query incorporated therein, the index query being for searching for the registration keyword index; and
an encrypted index generation unit to generate an encrypted index by encrypting the registration keyword index by using the index disclosure key.

Advantageous Effects of Invention

According to the searchable encryption system of the present disclosure, the encrypted index generation unit generates an encrypted index. The encrypted index corresponds to a registration keyword. The registration keyword may correspond to data registered in the data management device. Thus, by searching for the registration keyword by using the encrypted index, the searcher can search for the data registered in the data management device relatively at high speeds.

BRIEF DESCRIPTION OF DRAWINGS

FIG. 19 is a diagram illustrating attribute information in Embodiment 1.

FIG. 21 is a diagram illustrating a registration database 892 in Embodiment 1.

FIG. 23 is a diagram illustrating a post-index-disclosure database 893 in Embodiment 1.

DESCRIPTION OF EMBODIMENTS

Figure 1:
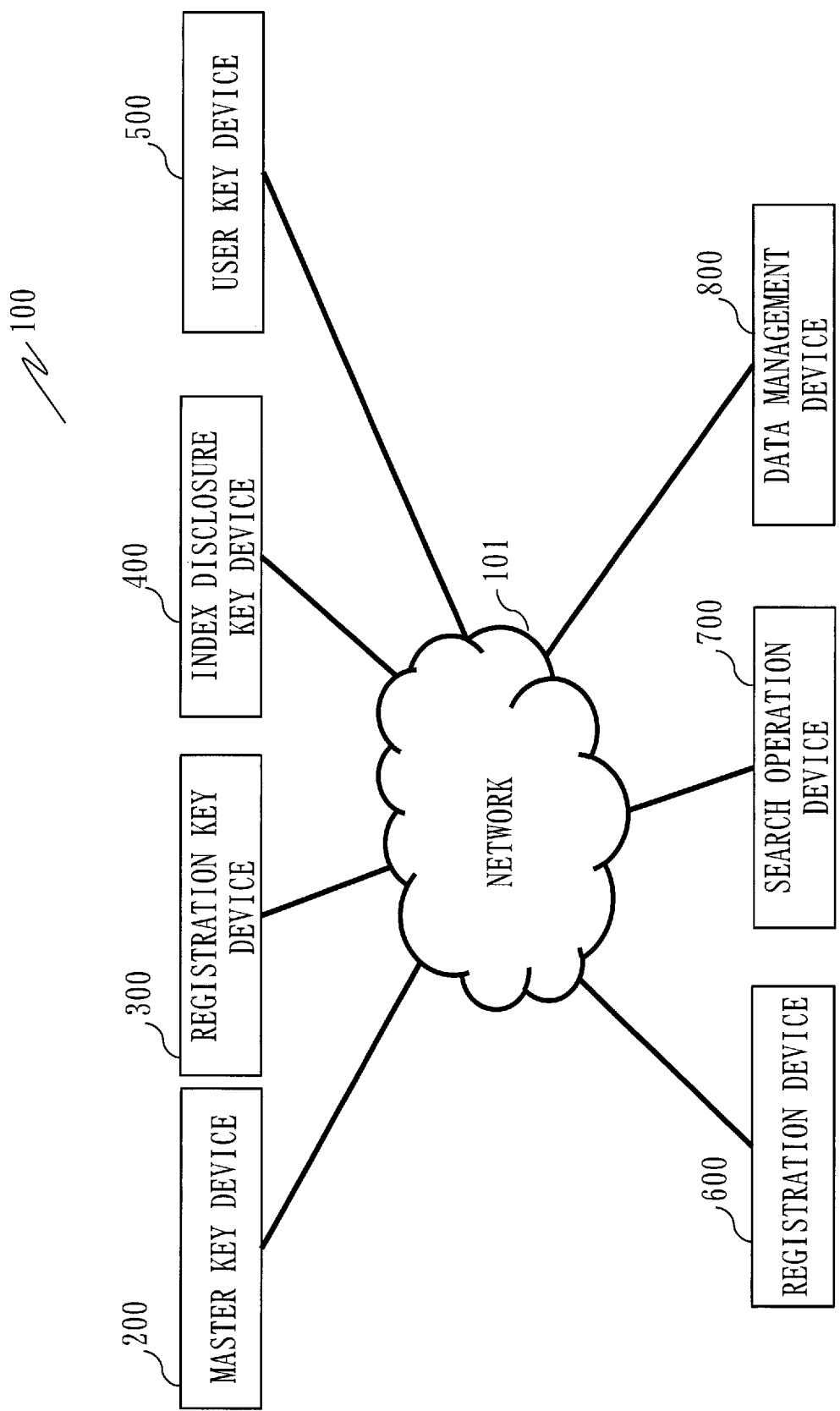
FIG. 1 is a structural diagram of a searchable encryption system 100 in Embodiment 1.

In the description and drawings of an embodiment, the same components and corresponding components have the same reference character. Description of components provided with the same reference character is omitted or simplified as appropriate. An arrow in a drawing mainly illustrates a flow of data or flow of process.

Embodiment 1

First, processes by a register, a searcher, and a data management device in a searchable encryption are each briefly described.

The register is a user who registers encrypted data. The register may include a device for registering data.

The searcher is a user who searches for encrypted data. The searcher may include a device for searching for data.

The data management device is a device that stores encrypted data.

A basic process to be performed by the register is as follows.

First, the register generates encrypted data by encrypting data to be registered.

Next, the register generates a registration keyword for searching for encrypted data.

Next, the register encrypts the registration keyword. An encrypted registration keyword is referred to as an encrypted tag. The encrypted tag may have data other than the registration keyword incorporated therein. It is difficult to estimate the registration keyword based on the encrypted tag.

Next, the register associates the encrypted tag to the encrypted data. The number of encrypted tags is not required to be one. That is, the register may associate a plurality of encrypted tags with the encrypted data.

Then, the register registers the encrypted data and the encrypted tag in the data management device.

A basic process to be performed by the searcher is as follows.

First, the searcher selects a search keyword for use in searching.

Next, the searcher encrypts the search keyword by using a secret key. The secret key has information about the searcher incorporated therein. An encrypted search keyword is referred to as a search query. The search query may have data other than the search keyword incorporated therein. It is difficult to estimate the secret key, the search keyword, or the like based on the search query.

Next, by transmitting the search query to the data management device, the searcher makes a request to the data management device for searching for data corresponding to the search keyword.

Then, the searcher receives encrypted data corresponding to the search query from the data management device.

A basic process to be performed by the data management device is as follows.

In the data management device, at least one set of encrypted data and an encrypted tag is registered.

First, the data management device receives a search query.

Next, by performing a special arithmetic operation, the data management device selects an encrypted tag corresponding to the search query. The special arithmetic operation is an operation for comparing the search keyword with a registered keyword corresponding to each encrypted tag without decoding the encrypted tag.

Then, the data management device transmits the encrypted data associated with the selected encrypted tag to the searcher.

In the encrypted tag, information indicating an authorized person, who is a search-permitted searcher, may be incorporated. As a specific example, it is assumed that the encrypted tag has incorporated therein information indicating that only a searcher A is permitted to search. Consider a case in which a searcher B uses a secret key corresponding to the searcher B to generate a search query by using a search keyword matching a registered keyword incorporated in this encrypted tag and search for encrypted data by using this search query. In this case, the data management device determines that the searcher corresponding to the encrypted tag and the searcher corresponding to the search query do not match.

In the following, the present embodiment is described in detail with reference to the drawings.

A searchable encryption system 100 according to the present embodiment conducts a searchable encryption by generating an index by using multiuser-type common key cryptography, encrypting the generated index, decoding the encrypted index, and using the decoded index.

Description of Structure

FIG. 1 illustrates an example of structure of the searchable encryption system 100.

The searchable encryption system 100 includes, as illustrated in the drawing, a master key device 200, a registration key device 300, an index disclosure key device 400, a user key device 500, a registration device 600, a search operation device 700, and a data management device 800. The searchable encryption system may be configured of at least one device illustrated in the drawing.

The devices included in the searchable encryption system 100 are each connected mutually via a network 101. At least one device included in the searchable encryption system 100 may not be connected to all of the other devices.

Figure 2:
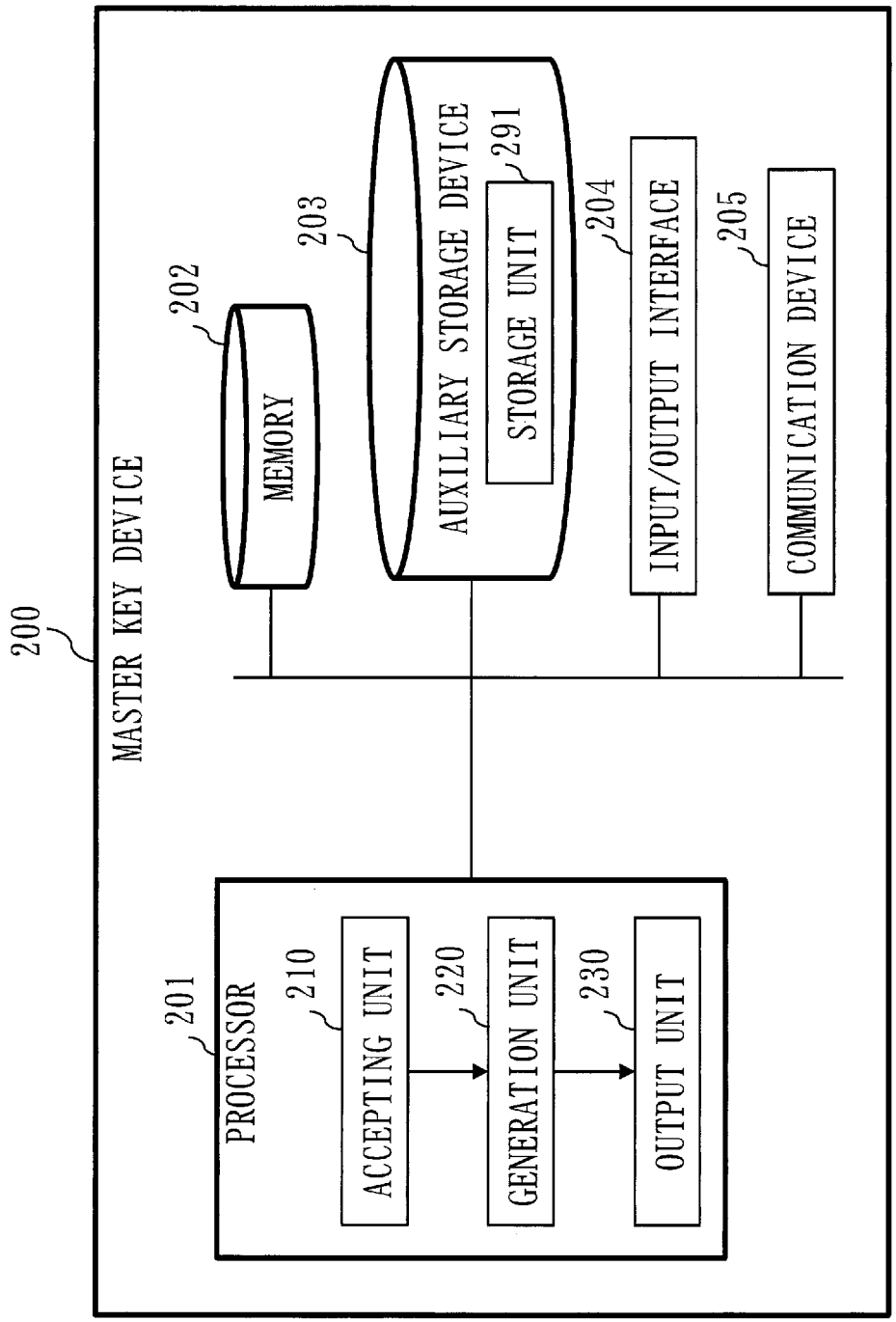
FIG. 2 is a structural diagram of a master key device 200 in Embodiment 1.

FIG. 2 illustrates an example of structure of the master key device 200 according to the present embodiment.

The master key device 200 is, as illustrated in the drawing, a computer including hardware such as a processor 201, a memory 202, an auxiliary storage device 203, an input/output interface 204, and a communication device 205. These pieces of hardware are connected mutually via signal lines.

The processor 201 is an IC (Integrated Circuit) which performs an arithmetic process, and controls hardware included in a computer. The processor 201 is, as a specific example, a CPU (Central Processing Unit), DSP (Digital Signal Processor), or GPU (Graphics Processing Unit).

The memory 202 is typically a volatile storage device. The memory 202 is also referred to as a main storage device or main memory. The memory 202 is, as a specific example, a RAM (Random Access Memory). Data stored in the memory 202 is stored in the auxiliary storage device 203 as required.

The auxiliary storage device 203 is typically a non-volatile storage device. The auxiliary storage device 203 is, as a specific example, a ROM (Read Only Memory), HDD (Hard Disk Drive), or flash memory. Data stored in the auxiliary storage device 203 is loaded into the memory 202 as required.

The input/output interface 204 is a port to which an input device and an output device are connected. The input/output interface 204 is, as a specific example, a USB (Universal Serial Bus) terminal. The input device is, as a specific example, a keyboard and a mouse. The output device is, as a specific example, a display.

The communication device 205 is a receiver and a transmitter. The communication device 205 is, as a specific example, a communication chip or NIC (Network Interface Card).

The master key device 200 includes components such as an accepting unit 210, a generation unit 220, and an output unit 230. These components are implemented by software.

The auxiliary storage device 203 has a master key program stored therein. The master key program is a program which causes a computer to achieve the functions of the accepting unit 210, the generation unit 220, the output unit 230, and a storage unit 291. The master key program is loaded into the memory 202 and executed by the processor 201.

The auxiliary storage device 203 has an OS (Operating System) stored therein. At least part of the OS is loaded into the memory 202 and executed by the processor 201. That is, the processor 201 executes the master key program while executing the OS.

Data obtained by executing the master key program is stored in a storage device such as the memory 202, the auxiliary storage device 203, a register in the processor 201, or a cache memory in the processor 201.

The auxiliary storage device 203 functions as the storage unit 291. At least part of the storage devices other than the auxiliary storage device 203 may function as the storage unit 291 in place of the auxiliary storage device 203 or together with the auxiliary storage device 203.

The master key device 200 may include a plurality of processors which replace the processor 201. The plurality of processors share the role of the processor 201.

Each program described in the specification may be recorded (stored) in a non-volatile recording medium so as to be readable by a computer. The non-volatile recording medium is, as a specific example, an optical disk or flash memory.

Figure 3:
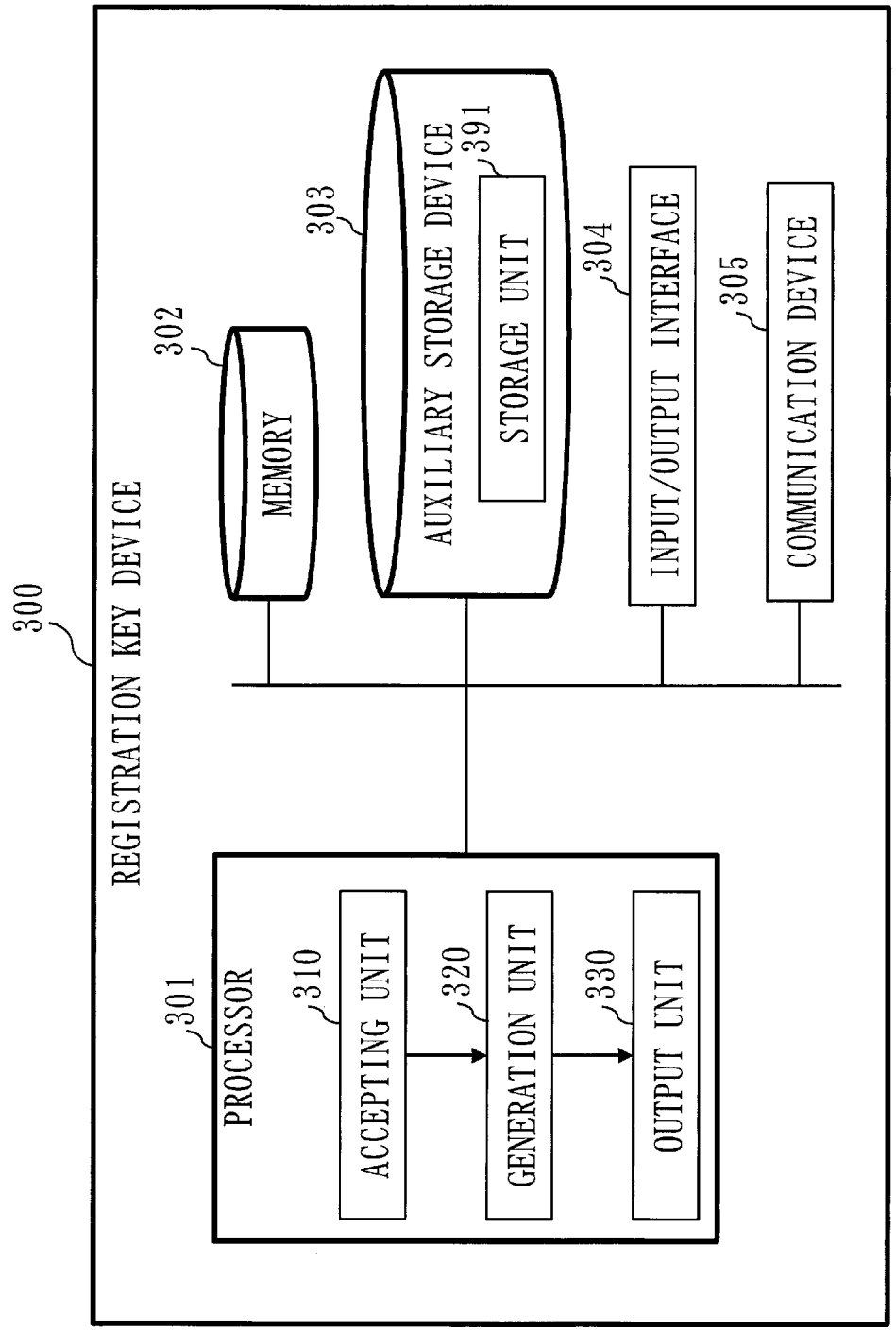
FIG. 3 is a structural diagram of a registration key device 300 in Embodiment 1.

FIG. 3 illustrates an example of structure of the registration key device 300 according to the present embodiment.

The registration key device 300 is, as illustrated in the drawing, a computer including hardware such as a processor 301, a memory 302, an auxiliary storage device 303, an input/output interface 304, and a communication device 305. These pieces of hardware are connected mutually via signal lines.

The processor 301 is equivalent to the processor 201. The memory 302 is equivalent to the memory 202. The auxiliary storage device 303 is equivalent to the auxiliary storage device 203. The input/output interface 304 is equivalent to the input/output interface 204. The communication device 305 is equivalent to the communication device 205.

The registration key device 300 includes components such as an accepting unit 310, a generation unit 320, and an output unit 330. These components are implemented by software.

The auxiliary storage device 303 has a registration key program stored therein. The registration key program is a program which causes a computer to achieve the functions of the accepting unit 310, the generation unit 320, the output unit 330, and a storage unit 391. The registration key program is loaded into the memory 302 and executed by the processor 301.

The auxiliary storage device 303 has an OS stored therein. At least part of the OS is loaded into the memory 302 and executed by the processor 301. That is, the processor 301 executes the registration key program while executing the OS.

Data obtained by executing the registration key program is stored in a storage device such as the memory 302, the auxiliary storage device 303, a register in the processor 301, or a cache memory in the processor 301.

The auxiliary storage device 303 functions as the storage unit 391. At least part of the storage devices other than the auxiliary storage device 303 may function as the storage unit 391 in place of the auxiliary storage device 303 or together with the auxiliary storage device 303.

The registration key device 300 may include a plurality of processors which replace the processor 301. The plurality of processors share the role of the processor 301.

Figure 4:
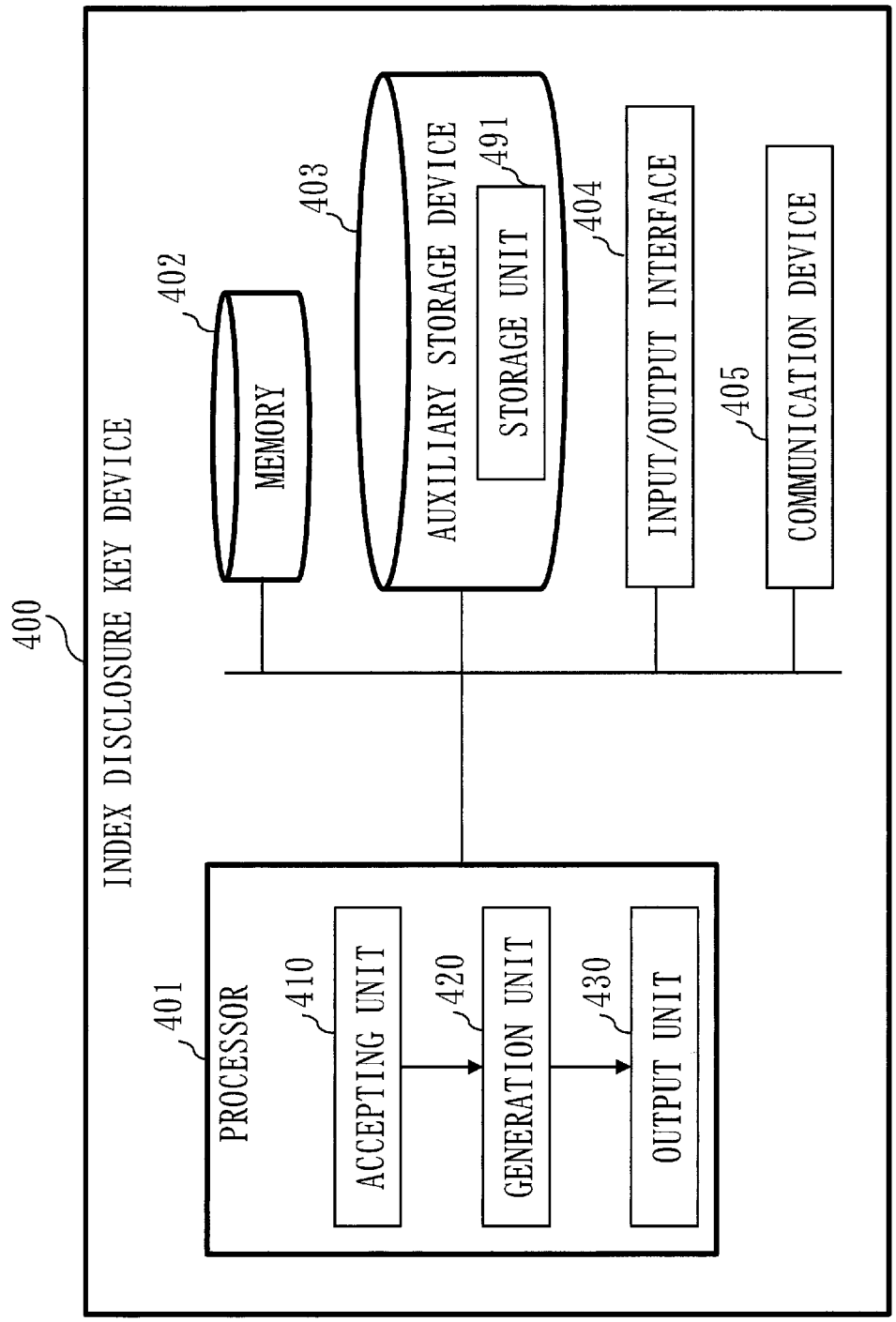
FIG. 4 is a structural diagram of an index disclosure key device 400 in Embodiment 1.

FIG. 4 illustrates an example of structure of the index disclosure key device 400 according to the present embodiment.

The index disclosure key device 400 is, as illustrated in the drawing, a computer including hardware such as a processor 401, a memory 402, an auxiliary storage device 403, an input/output interface 404, and a communication device 405. These pieces of hardware are connected mutually via signal lines.

The processor 401 is equivalent to the processor 201. The memory 402 is equivalent to the memory 202. The auxiliary storage device 403 is equivalent to the auxiliary storage device 203. The input/output interface 404 is equivalent to the input/output interface 204. The communication device 405 is equivalent to the communication device 205.

The index disclosure key device 400 includes components such as an accepting unit 410, a generation unit 420, and an output unit 430. These components are implemented by software.

The auxiliary storage device 403 has an index disclosure key program stored therein. The index disclosure key program is a program which causes a computer to achieve the functions of the accepting unit 410, the generation unit 420, the output unit 430, and a storage unit 491. The index disclosure key program is loaded into the memory 402 and executed by the processor 401.

The auxiliary storage device 403 has an OS stored therein. At least part of the OS is loaded into the memory 402 and executed by the processor 401. That is, the processor 401 executes the index disclosure key program while executing the OS.

Data obtained by executing the index disclosure key program is stored in a storage device such as the memory 402, the auxiliary storage device 403, a register in the processor 401, or a cache memory in the processor 401.

The auxiliary storage device 403 functions as the storage unit 491. At least part of the storage devices other than the auxiliary storage device 403 may function as the storage unit 491 in place of the auxiliary storage device 403 or together with the auxiliary storage device 403.

The index disclosure key device 400 may include a plurality of processors which replace the processor 401. The plurality of processors share the role of the processor 401.

Figure 5:
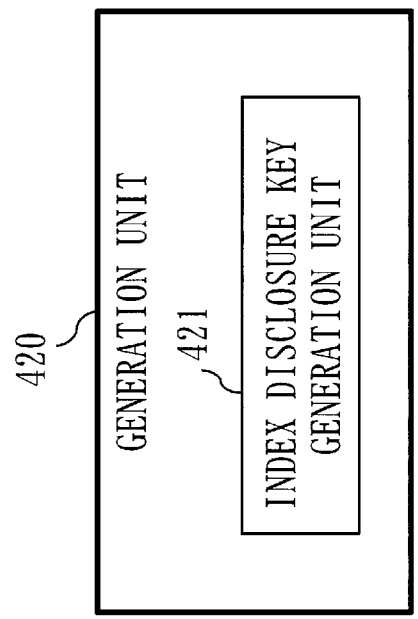
FIG. 5 is a structural diagram of a generation unit 420 in Embodiment 1.

FIG. 5 illustrates an example of structure of the generation unit 420.

The generation unit 420 includes, as illustrated in the drawing, an index disclosure key generation unit 421.

Figure 6:
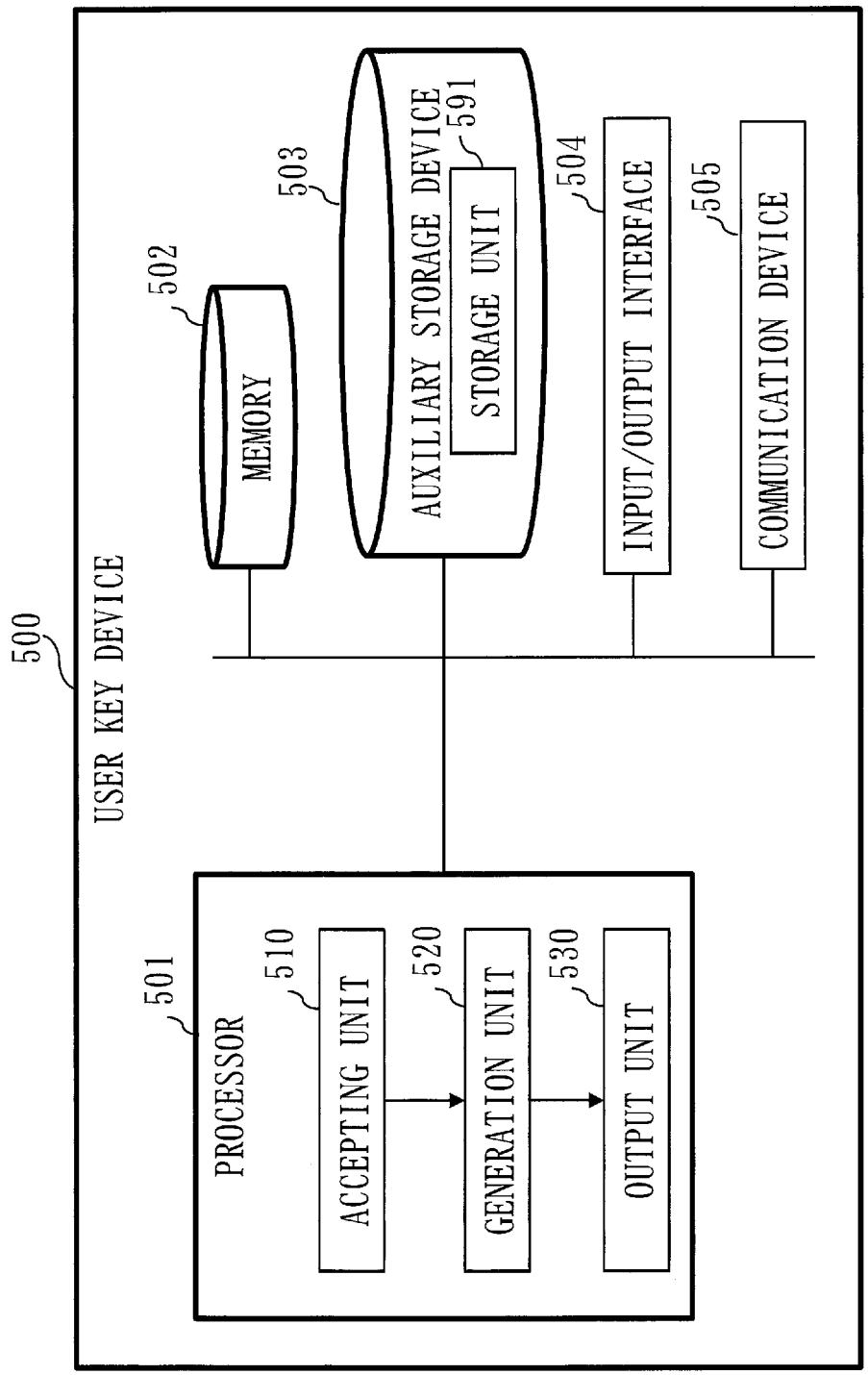
FIG. 6 is a structural diagram of a user key device 500 in Embodiment 1.

FIG. 6 illustrates an example of structure of the user key device 500 according to the present embodiment.

The user key device 500 is, as illustrated in the drawing, a computer including hardware such as a processor 501, a memory 502, an auxiliary storage device 503, an input/output interface 504, and a communication device 505. These pieces of hardware are connected mutually via signal lines.

The processor 501 is equivalent to the processor 201. The memory 502 is equivalent to the memory 202. The auxiliary storage device 503 is equivalent to the auxiliary storage device 203. The input/output interface 504 is equivalent to the input/output interface 204. The communication device 505 is equivalent to the communication device 205.

The user key device 500 includes components such as an accepting unit 510, a generation unit 520, and an output unit 530. These components are implemented by software.

The auxiliary storage device 503 has a user key program stored therein. The user key program is a program which causes a computer to achieve the functions of the accepting unit 510, the generation unit 520, the output unit 530, and a storage unit 591. The user key program is loaded into the memory 502 and executed by the processor 501.

The auxiliary storage device 503 has an OS stored therein. At least part of the OS is loaded into the memory 502 and executed by the processor 501. That is, the processor 501 executes the user key program while executing the OS.

Data obtained by executing the user key program is stored in a storage device such as the memory 502, the auxiliary storage device 503, a register in the processor 501, or a cache memory in the processor 501.

The auxiliary storage device 503 functions as the storage unit 591. At least part of the storage devices other than the auxiliary storage device 503 may function as the storage unit 591 in place of the auxiliary storage device 503 or together with the auxiliary storage device 503.

The user key device 500 may include a plurality of processors which replace the processor 501. The plurality of processors share the role of the processor 501.

The output unit 530 is also referred to as a user data output unit. The output unit 530 outputs a user key to the search operation device 700. A user key UK is a key having searcher attribute information incorporated therein. The searcher attribute information is information indicating an attribute that the searcher who searches for a registration keyword W has, and is also referred to as attribute information.

The storage unit 591 is also referred to as a user data storage unit. The storage unit 591 may have the searcher attribute information stored therein.

Figure 7:
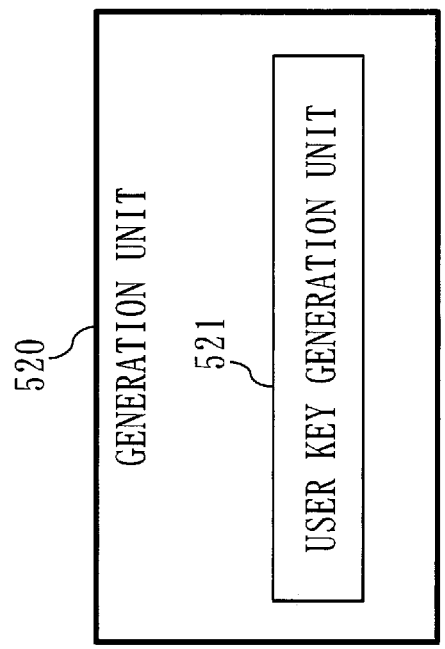
FIG. 7 is a structural diagram of a generation unit 520 in Embodiment 1.

FIG. 7 illustrates an example of structure of the generation unit 520.

The generation unit 520 includes, as illustrated in the drawing, a user key generation unit 521.

The user key generation unit 521 generates the user key UK by using the searcher attribute information and a user key function.

Figure 8:
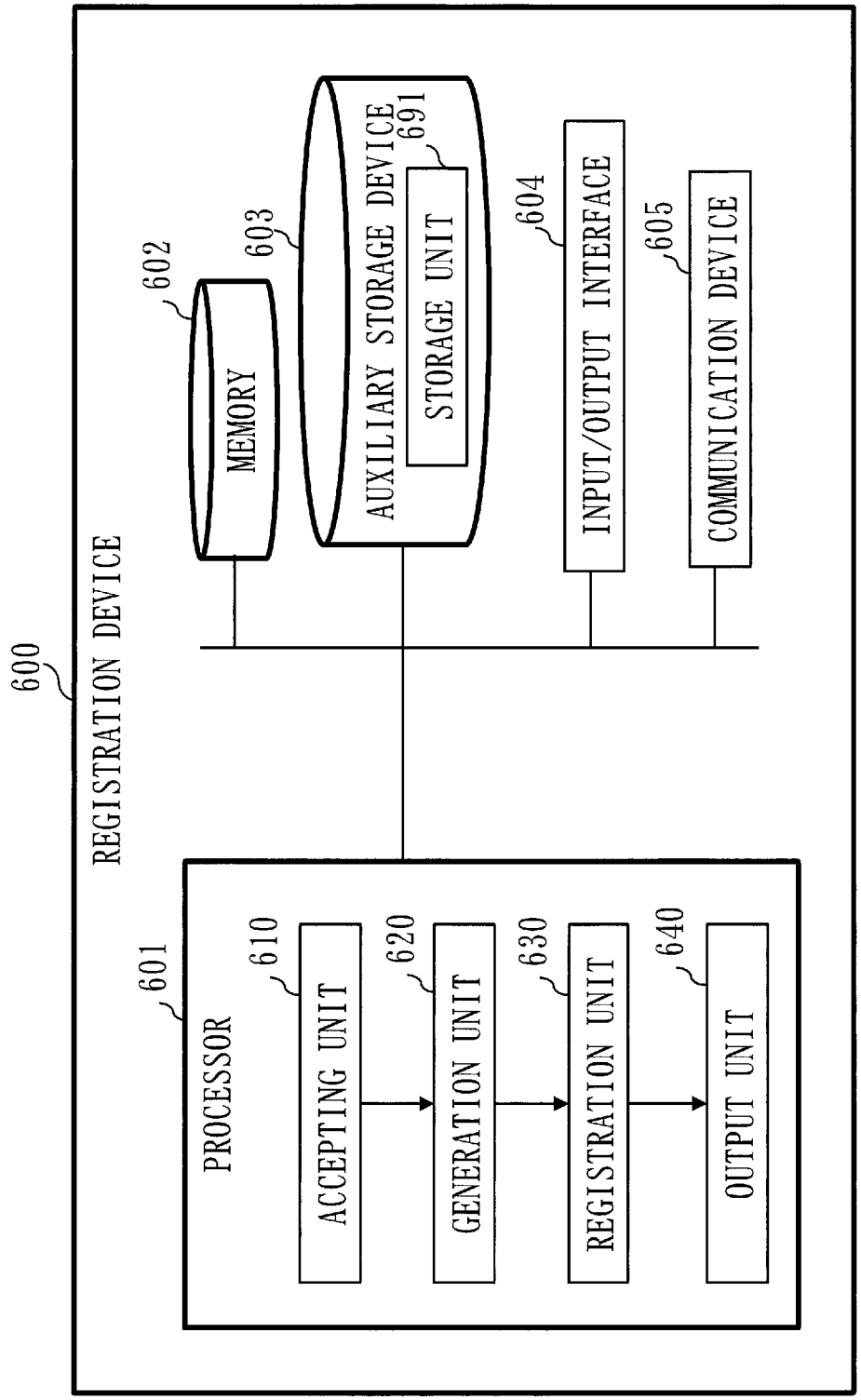
FIG. 8 is a structural diagram of a registration device 600 in Embodiment 1.

FIG. 8 illustrates an example of structure of the registration device 600 according to the present embodiment.

The registration device 600 is, as illustrated in the drawing, a computer including hardware such as a processor 601, a memory 602, an auxiliary storage device 603, an input/output interface 604, and a communication device 605. These pieces of hardware are connected mutually via signal lines.

The processor 601 is equivalent to the processor 201. The memory 602 is equivalent to the memory 202. The auxiliary storage device 603 is equivalent to the auxiliary storage device 203. The input/output interface 604 is equivalent to the input/output interface 204. The communication device 605 is equivalent to the communication device 205.

The registration device 600 includes components such as an accepting unit 610, a generation unit 620, a registration unit 630, and an output unit 640. These components are implemented by software.

The auxiliary storage device 603 has a registration program stored therein. The registration program is a program which causes a computer to achieve the functions of the accepting unit 610, the generation unit 620, the registration unit 630, the output unit 640, and a storage unit 691. The registration program is loaded into the memory 602 and executed by the processor 601.

The auxiliary storage device 603 has an OS stored therein. At least part of the OS is loaded into the memory 602 and executed by the processor 601. That is, the processor 601 executes the registration program while executing the OS.

Data obtained by executing the registration program is stored in a storage device such as the memory 602, the auxiliary storage device 603, a register in the processor 601, or a cache memory in the processor 601.

The auxiliary storage device 603 functions as the storage unit 691. However, at least part of the storage devices other than the auxiliary storage device 603 may function as the storage unit 691 in place of the auxiliary storage device 603 or together with the auxiliary storage device 603.

The registration device 600 may include a plurality of processors which replace the processor 601. The plurality of processors share the role of the processor 601.

The output unit 640 is also referred to as a registration data output unit. The output unit 640 outputs an encrypted tag CT to the data management device 800, and outputs an encrypted index EI to the data management device 800.

The storage unit 691 is also referred to as a registration data storage unit. The storage unit 691 may have stored therein the registration keyword W, authorized-person attribute information, and an index disclosure key IK. The authorized-person attribute information is information indicating an attribute to be owned by an authorized person who has an authority to search for the registration keyword W, and is also referred to as attribute information. The authorized-person attribute information may include a wildcard. The wildcard in the authorized-person attribute information is data indicating that a searcher corresponding to searcher attribute information is permitted to search for the registration keyword W irrespective of what the attribute included in the searcher attribute information is like. A registration keyword index is an index corresponding to encrypted data to be registered by the registration device 600 in the data management device 800, and is also referred to as an index I. The registration keyword index is an index corresponding to the registration keyword W. The index disclosure key IK is a key for encrypting the registration keyword index. The index disclosure key IK may be a key capable of decoding at least part of the encrypted index.

Figure 9:
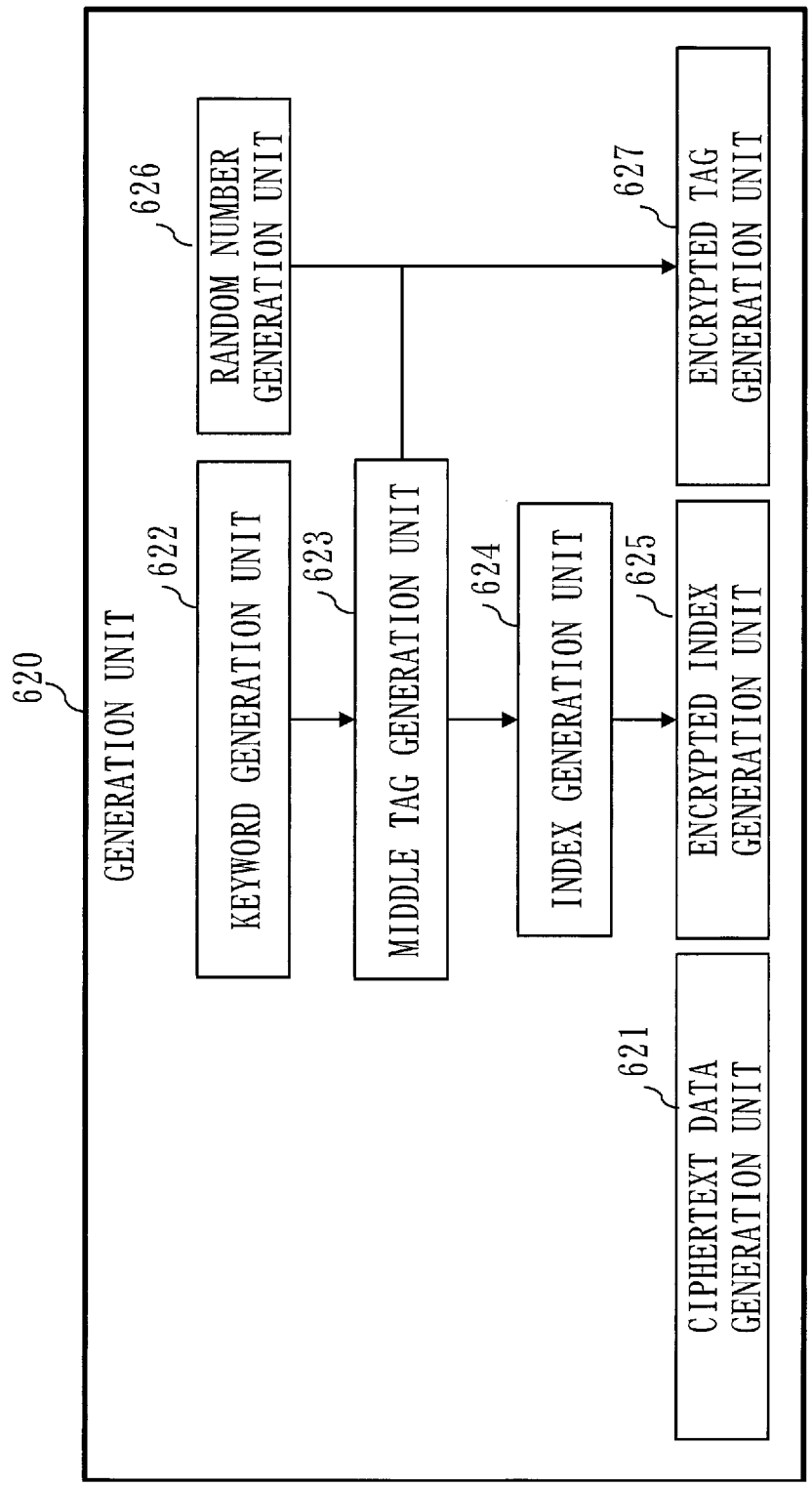
FIG. 9 is a structural diagram of a generation unit 620 in Embodiment 1.

FIG. 9 illustrates an example of structure of the generation unit 620.

The generation unit 620 includes, as illustrated in the drawing, a ciphertext data generation unit 621, a keyword generation unit 622, a middle tag generation unit 623, an index generation unit 624, an encrypted index generation unit 625, a random number generation unit 626, and an encrypted tag generation unit 627.

The middle tag generation unit 623 generates a middle tag MT corresponding to the registration keyword W by using the authorized-person attribute information, the registration keyword W, a user key function, and a search query function. The user key function is a function for use in generating the user key UK. The search query function is a function for use in generating a search query SQ. The search query SQ has the user key UK incorporated therein, and corresponds to a search keyword w. The search keyword w is a keyword for use by the searcher in searching for the registration keyword W.

The middle tag generation unit 623 may incorporate a wildcard into the middle tag MT.

The index generation unit 624 generates a registration keyword index by using the registration keyword W, the authorized-person attribute information, the user key function, the search query function, and an index query function. The index query function is a function for use in generating an index query IQ or a partial index query IQ'. The index query IQ has the search query SQ incorporated therein, and is data for use in searching for the registration keyword index.

The index generation unit 624 may generate the registration keyword index by using the middle tag MT.

The encrypted index generation unit 625 generates the encrypted index EI by encrypting the registration keyword index by using the index disclosure key IK.

The random number generation unit 626 generates a random number as an encrypted tag random number.

The encrypted tag generation unit 627 generates the encrypted tag CT by using the middle tag MT, the encrypted tag random number, and an encrypted tag function. The encrypted tag function is used for generating an encrypted tag having the registration keyword W incorporated therein.

The encrypted tag generation unit 627 generates an encrypted tag collator by using the registration keyword W, the encrypted tag random number, the encrypted tag function, and a collator function. The encrypted tag generation unit 627 may couple the encrypted tag random number and the encrypted tag collator to the encrypted tag CT. The collator function is a function for use in generating an encrypted tag collator corresponding to the encrypted tag CT.

Figure 10:
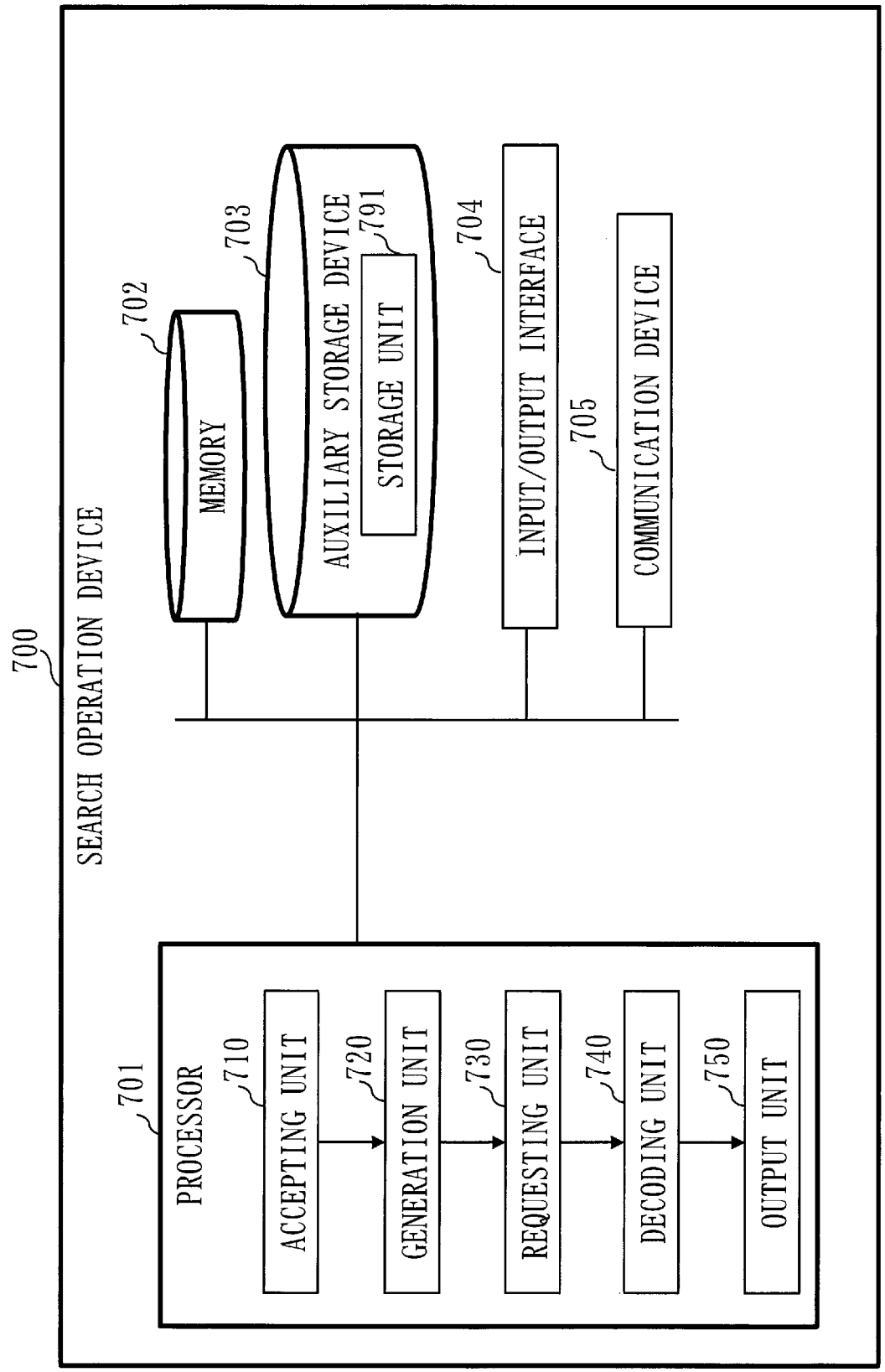
FIG. 10 is a structural diagram of a search operation device 700 in Embodiment 1.

FIG. 10 illustrates an example of structure of the search operation device 700 according to the present embodiment.

The search operation device 700 is, as illustrated in the drawing, a computer including hardware such as a processor 701, a memory 702, an auxiliary storage device 703, an input/output interface 704, and a communication device 705. These pieces of hardware are connected mutually via signal lines.

The processor 701 is equivalent to the processor 201. The memory 702 is equivalent to the memory 202. The auxiliary storage device 703 is equivalent to the auxiliary storage device 203. The input/output interface 704 is equivalent to the input/output interface 204. The communication device 705 is equivalent to the communication device 205.

The search operation device 700 includes components such as an accepting unit 710, a generation unit 720, a requesting unit 730, a decoding unit 740, and an output unit 750. These components are implemented by software.

The auxiliary storage device 703 has a search operation program stored therein. The search operation program is a program which causes a computer to achieve the functions of the accepting unit 710, the generation unit 720, the requesting unit 730, the decoding unit 740, the output unit 750, and a storage unit 791. The search operation program is loaded into the memory 702 and executed by the processor 701.

The auxiliary storage device 703 has an OS stored therein. At least part of the OS is loaded into the memory 702 and executed by the processor 701. That is, the processor 701 executes the search operation program while executing the OS.

Data obtained by executing the search operation program is stored in a storage device such as the memory 702, the auxiliary storage device 703, a register in the processor 701, or a cache memory in the processor 701.

The auxiliary storage device 703 functions as the storage unit 791. At least part of the storage devices other than the auxiliary storage device 703 may function as the storage unit 791 in place of the auxiliary storage device 703 or together with the auxiliary storage device 703.

The search operation device 700 may include a plurality of processors which replace the processor 701. The plurality of processors share the role of the processor 701.

The accepting unit 710 is also referred to as a search data accepting unit. The accepting unit 710 accepts the user key UK, and causes the user key UK to be stored in the storage unit 791.

The output unit 750 is also referred to as a search data output unit. The output unit 750 outputs the search query SQ and the index query IQ to the data management device 800.

The storage unit 791 is also referred to as a search data storage unit. The storage unit 791 may have the user key UK and the search keyword w stored therein.

Figure 11:
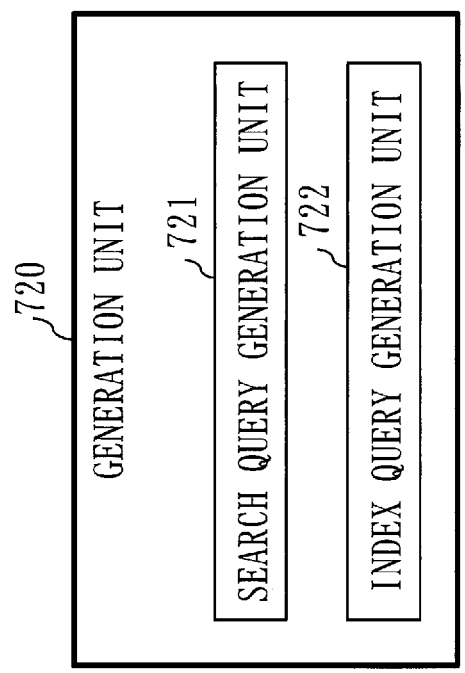
FIG. 11 is a structural diagram of a generation unit 720 in Embodiment 1.

FIG. 11 illustrates an example of structure of the generation unit 720.

The generation unit 720 includes, as illustrated in the drawing, a search query generation unit 721 and an index query generation unit 722.

The search query generation unit 721 generates the search query SQ by using the user key UK, the search keyword w, and the search query function.

The index query generation unit 722 generates the index query IQ by using the search query SQ and the index query function.

Figure 12:
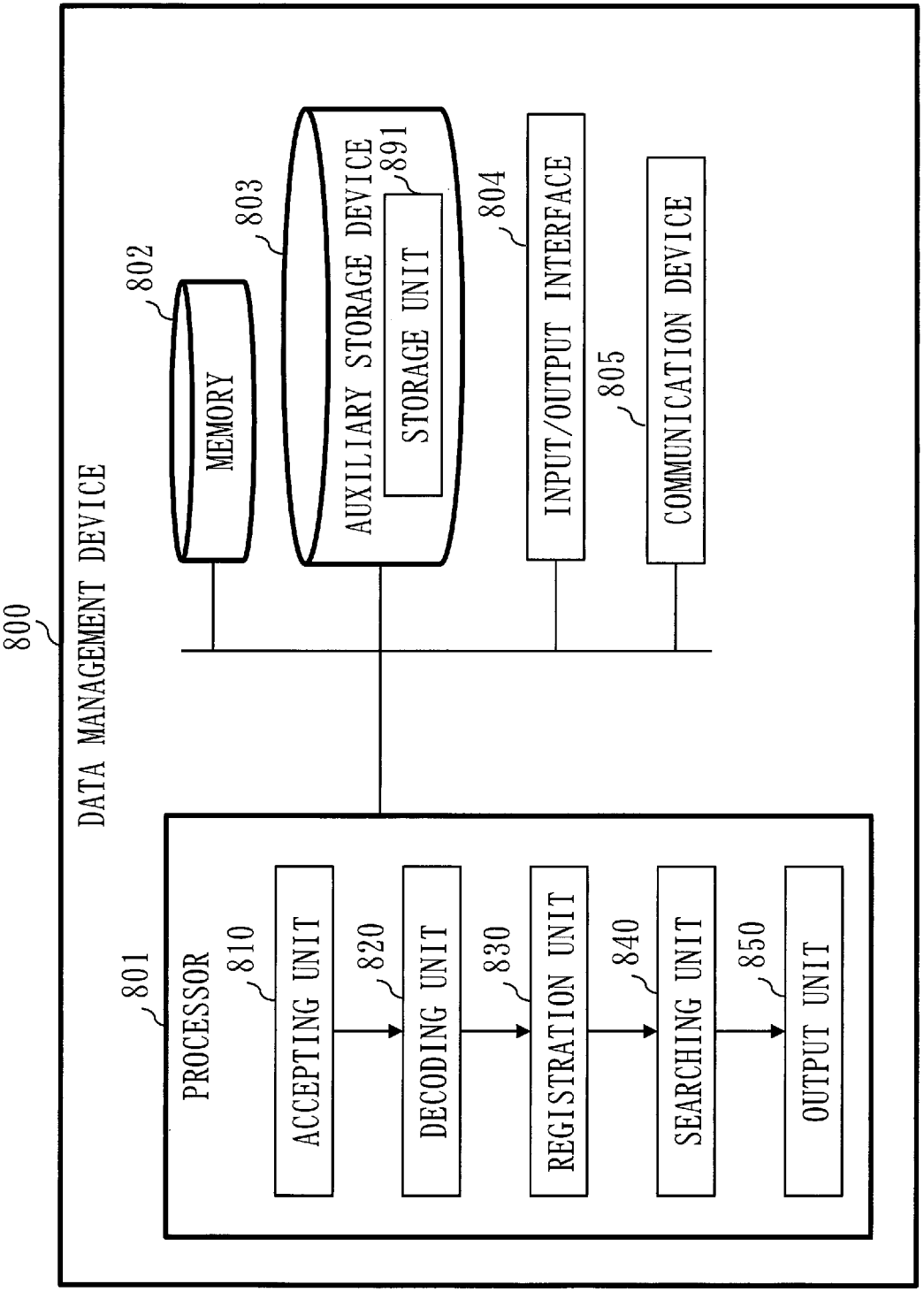
FIG. 12 is a structural diagram of a data management device 800 in Embodiment 1.

FIG. 12 illustrates an example of structure of the data management device 800 according to the present embodiment.

The data management device 800 is, as illustrated in the drawing, a computer including hardware such as a processor 801, a memory 802, an auxiliary storage device 803, an input/output interface 804, and a communication device 805. These pieces of hardware are connected mutually via signal lines.

The processor 801 is equivalent to the processor 201. The memory 802 is equivalent to the memory 202. The auxiliary storage device 803 is equivalent to the auxiliary storage device 203. The input/output interface 804 is equivalent to the input/output interface 204. The communication device 805 is equivalent to the communication device 205.

The data management device 800 includes components such as an accepting unit 810, a decoding unit 820, a registration unit 830, a searching unit 840, and an output unit 850. These components are implemented by software.

The auxiliary storage device 803 has a data management program stored therein. The data management program is a program which causes a computer to achieve the functions of the accepting unit 810, the decoding unit 820, the registration unit 830, the searching unit 840, the output unit 850, and a storage unit 891. The data management program is loaded into the memory 802 and executed by the processor 801.

The auxiliary storage device 803 has an OS stored therein. At least part of the OS is loaded into the memory 802 and executed by the processor 801. That is, the processor 801 executes the data management program while executing the OS.

Data obtained by executing the data management program is stored in a storage device such as the memory 802, the auxiliary storage device 803, a register in the processor 801, or a cache memory in the processor 801.

The auxiliary storage device 803 functions as the storage unit 891. At least part of the storage devices other than the auxiliary storage device 803 may function as the storage unit 891 in place of the auxiliary storage device 803 or together with the auxiliary storage device 803.

The data management device 800 may include a plurality of processors which replace the processor 801. The plurality of processors share the role of the processor 801.

The accepting unit 810 is also referred to as a management data accepting unit. The accepting unit 810 accepts the encrypted tag CT, and causes the encrypted tag CT to be stored in the storage unit 891. The accepting unit 810 accepts the encrypted index EI, and causes the encrypted index EI to be stored in the storage unit 891. The accepting unit 810 accepts the search query SQ and the index query IQ, and causes the search query SQ and the index query IQ to be stored in the storage unit 891.

The storage unit 891 is also referred to as a management data storage unit. The storage unit 891 may have stored therein the search query SQ, the index disclosure key IK, the index query IQ, and index disclosure position information Pos. The index disclosure position information Pos is information indicating a position, that can be decoded by using the published index disclosure key IK, corresponding to at least part of the encrypted index EI. The published index disclosure key IK may be referred to as an index disclosure key IK. The published index disclosure key IK can decode at least part of the encrypted index EI. The published index disclosure key IK is the index disclosure key IK usable by devices except the index disclosure key device 400 and the registration device 600.

Figure 13:
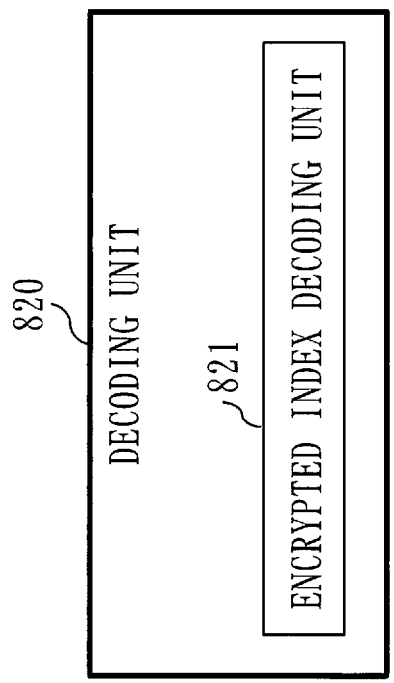
FIG. 13 is a structural diagram of a decoding unit 820 in Embodiment 1.

FIG. 13 illustrates an example of structure of the decoding unit 820.

The decoding unit 820 includes, as illustrated in the drawing, an encrypted index decoding unit 821.

The encrypted index decoding unit 821 generates a partial registration keyword index by decoding the encrypted index EI by using the index disclosure key IK. The partial registration keyword index is at least part of the registration keyword index.

Figure 14:
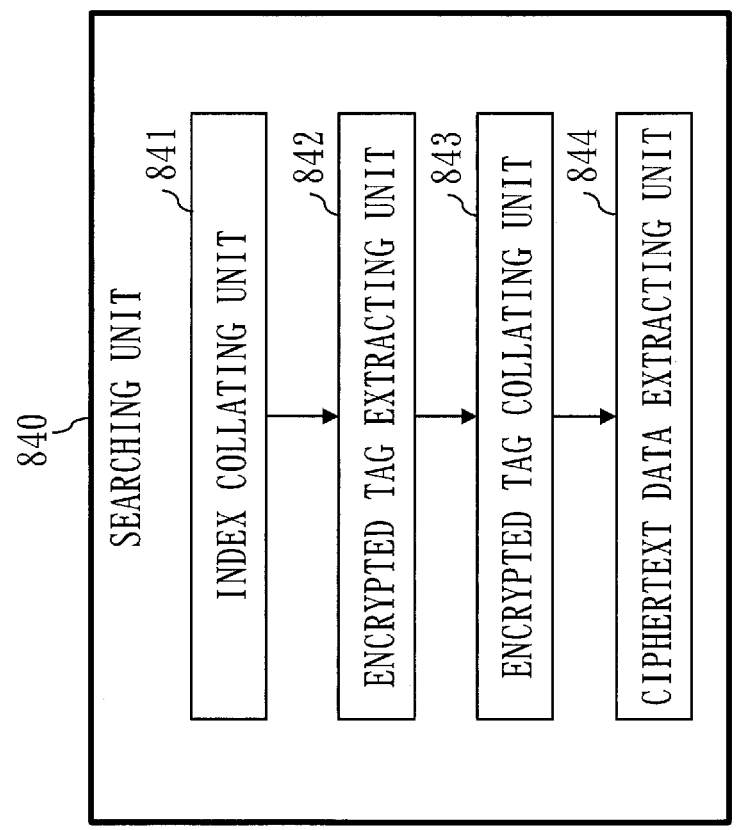
FIG. 14 is a structural diagram of a searching unit 840 in Embodiment 1.

FIG. 14 illustrates an example of structure of the searching unit 840.

The searching unit 840 includes, as illustrated in the drawing, an index collating unit 841, an encrypted tag extracting unit 842, an encrypted tag collating unit 843, and a ciphertext data extracting unit 844.

When the partial index query IQ' and the partial registration keyword index match each other, the index collating unit 841 determines that there is a possibility that the registration keyword W and the search keyword w match each other and the authorized-person attribute information and the searcher attribute information match each other. The partial index query IQ' is information included in the index query IQ and information corresponding to the partial registration keyword index.

The index collating unit 841 takes a portion corresponding to the index disclosure position information Pos in the index query IQ as the partial index query IQ'.

A process to be executed by the encrypted tag collating unit 843 is referred to as a collating process.

The encrypted tag collating unit 843 generates a determination-purpose collator by using the encrypted tag CT, the search query SQ, the encrypted tag random number coupled to the encrypted tag CT, the encrypted tag function, and the collator function. When the determination-purpose collator and the encrypted tag collator coupled to the encrypted tag are equal, the encrypted tag collating unit 843 determines that the registration keyword W and the search keyword w match. The determination-purpose collator is data for use in determining whether the search keyword w matches the registration keyword W.

The encrypted tag collating unit 843 may perform the collating process when the index collating unit 841 determines that there is a possibility that the registration keyword W and the search keyword w match and the authorized-person attribute information and the searcher attribute information match.

The searchable encryption program is a general term for a master key program, a registration key program, an index disclosure key program, a user key program, a registration program, a search operation program, and a data management program. The searchable encryption program may be one program or may be configured of a plurality of programs. At least one of the programs configuring the searchable encryption program may be provided as a program product.

Description of Operation

The operation procedure of the master key device 200 corresponds to a master key method. Also, a program achieving the operation of the master key device 200 corresponds to the master key program.

The operation procedure of the registration key device 300 corresponds to a registration key method. Also, a program achieving the operation of the registration key device 300 corresponds to the registration key program.

The operation procedure of the index disclosure key device 400 corresponds to an index disclosure key method. Also, a program achieving the operation of the index disclosure key device 400 corresponds to the index disclosure key program.

The operation procedure of the user key device 500 corresponds to a user key method. Also, a program achieving the operation of the user key device 500 corresponds to the user key program.

The operation procedure of the registration device 600 corresponds to a registration method. Also, a program achieving the operation of the registration device 600 corresponds to the registration program.

The operation procedure of the search operation device 700 corresponds to a search operation method. Also, a program achieving the operation of the search operation device 700 corresponds to the search operation program.

The operation procedure of the data management device 800 corresponds to a data management method. Also, a program achieving the operation of the data management device 800 corresponds to the data management program.

The operation procedure of the searchable encryption system 100 corresponds to a searchable encryption method. The searchable encryption method is a general term for the master key method, the registration key method, the index disclosure key method, the user key method, the registration method, the search operation method, and the data management method.

In the following, a specific example of the process of each device in the searchable encryption system 100 is described. The processes described in the following are processes included in the searchable encryption method.

Note that in the following, description is made to a case in which the searchable encryption system 100 uses the multiuser-type common key scheme disclosed in Patent Literature 1. However, the searchable encryption system 100 can perform the searchable encryption method in a manner similar to that in the following example even in the case of using another multiuser-type common key scheme.

Figure 15:
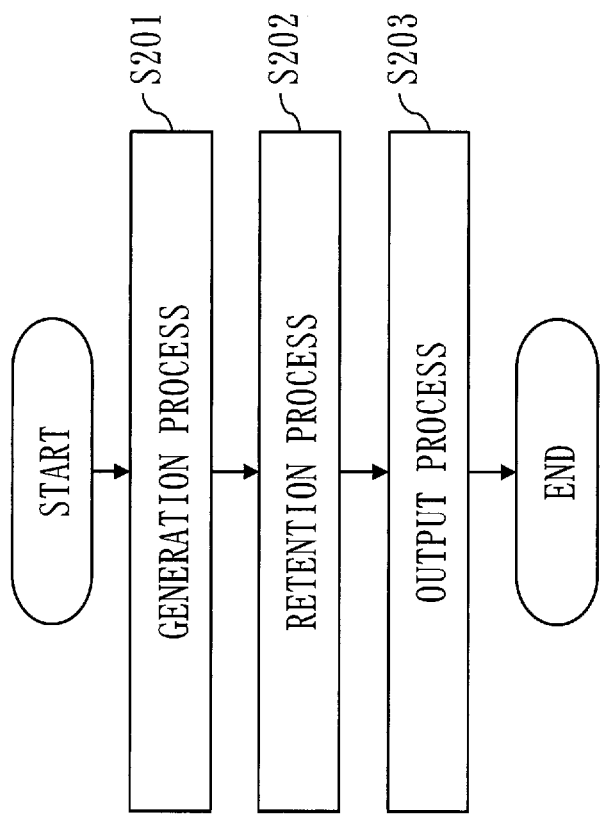
FIG. 15 is a flowchart illustrating operation of a master key generation process in Embodiment 1.

FIG. 15 is a flowchart illustrating one example of a master key generation process.

The master key generation process is a process to be performed by the master key device 200.
(Step S201: Generation Process)
The generation unit 220 generates a master key MK.
As a specific example, the generation unit 220 generates a random bit string of 256 bits as the master key MK. In this example, the generation unit 220 generates the master key MK of 256 bits.

(Step S202: Retention Process)
The generation unit 220 causes the master key MK to be stored in the storage unit 291. As a result, the master key MK is retained in the storage unit 291.
(Step S203: Output Process)
The output unit 230 outputs the master key MK.
As a specific example, the output unit 230 transmits the master key MK to the registration key device 300 by using the communication device 205.

Figure 16:
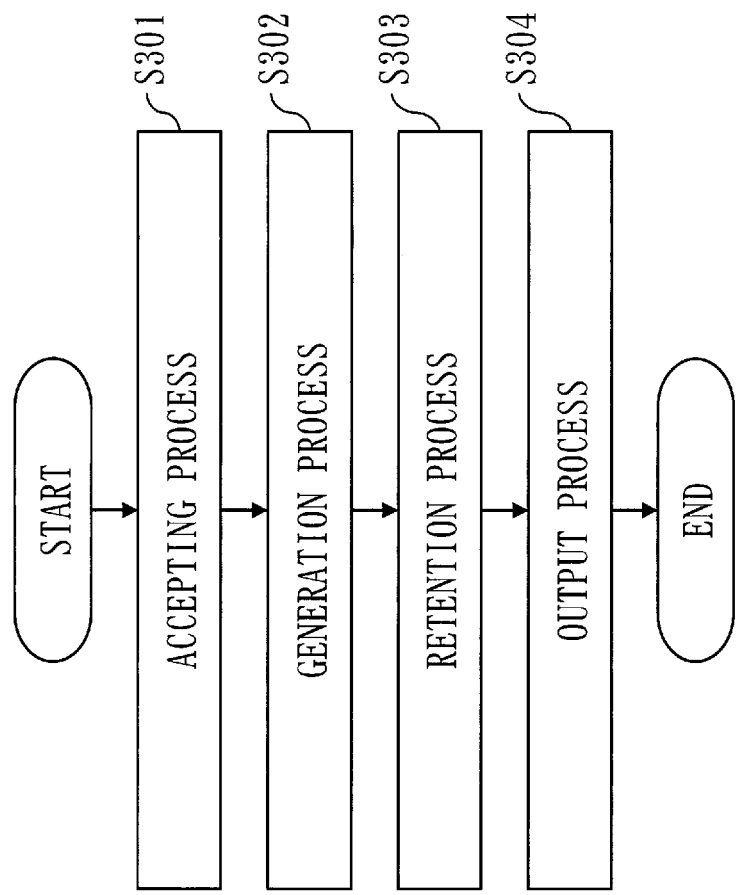
FIG. 16 is a flowchart illustrating operation of a registration key generation process in Embodiment 1.

FIG. 16 is a flowchart illustrating one example of a registration key generation process.

The registration key generation process is a process to be performed by the registration key device 300.
(Step S301: Accepting Process)
The accepting unit 310 accepts the master key MK.
As a specific example, the accepting unit 310 receives the master key MK from the master key device 200 by using the communication device 305. The accepting unit 310 may accept, via the input/output interface 304, the master key MK inputted to the registration key device 300.
(Step S302: Generation Process)
The generation unit 320 generates a registration key EK by using the master key MK. The generation unit 320 generates a data key DK and a tag key TK to generate the registration key EK.

The registration key EK is a set of the data key DK and the tag key TK. That is, the registration key EK may be represented as follows.

$$EK=(DK,TK)$$

The registration key EK includes the data key DK and the tag key TK.
(Step S303: Retention Process)
The generation unit 320 causes the registration key EK to be stored in the storage unit 391. As a result, the registration key EK is retained in the storage unit 391.
(Step S304: Output Process)
The output unit 330 outputs the registration key EK.
As a specific example, the output unit 330 transmits the registration key EK to each of the index disclosure key device 400, the user key device 500, and the registration device 600 by using the communication device 305.

The output unit 330 may transmit the tag key TK to the registration device 600 in place of the registration key EK.

Figure 17:
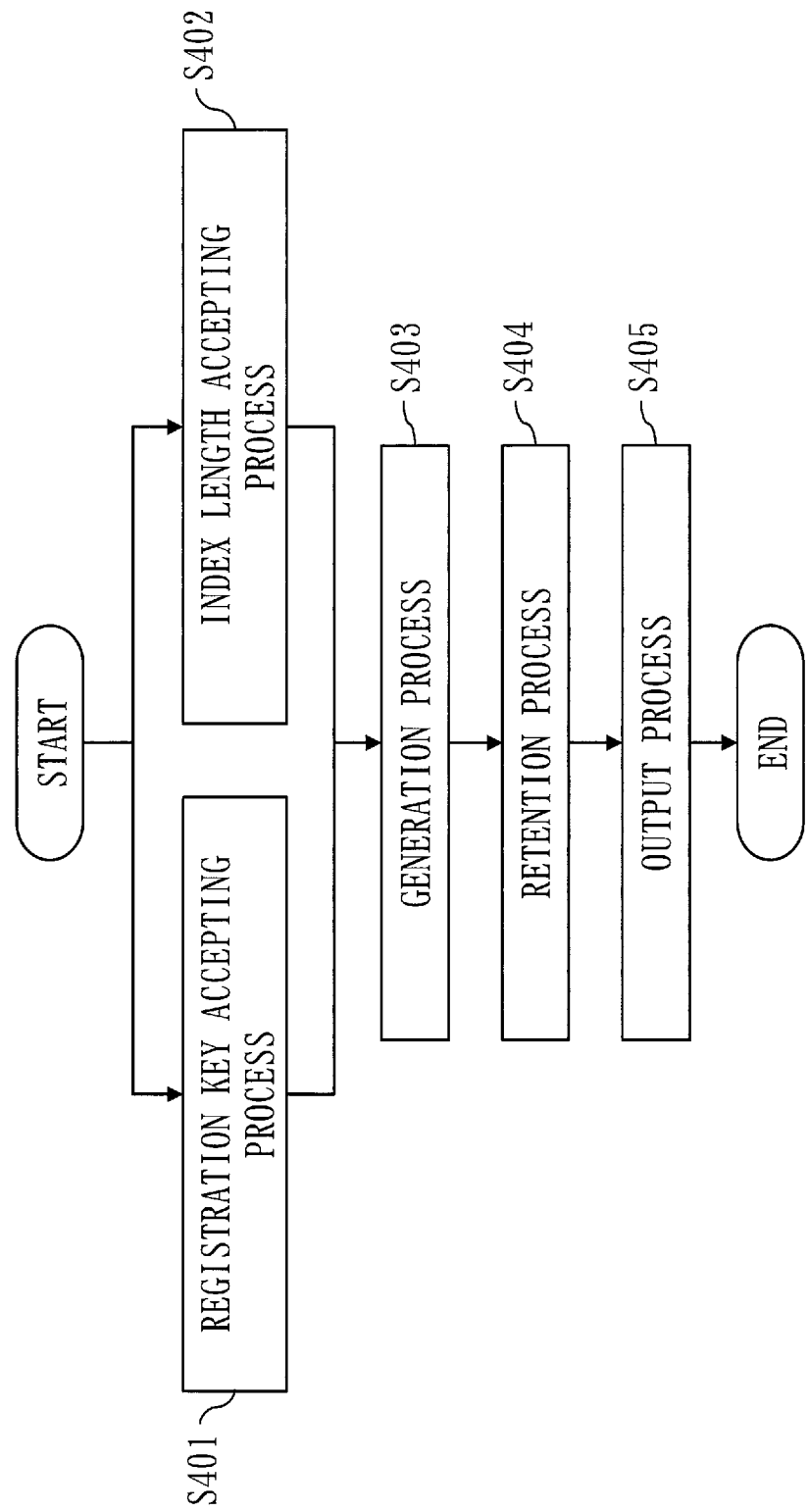
FIG. 17 is a flowchart illustrating operation of an index disclosure key generation process in Embodiment 1.

FIG. 17 is a flowchart illustrating one example of an index disclosure key generation process.

The index disclosure key generation process is a process to be performed by the index disclosure key device 400.
(Step S401: Registration Key Accepting Process)
The accepting unit 410 accepts the registration key EK.
As a specific example, the accepting unit 410 receives the registration key EK from the registration key device 300 by using the communication device 405. The accepting unit 410 may accept, via the input/output interface 404, the registration key EK inputted to the index disclosure key device 400.

The accepting unit 410 causes the registration key EK to be stored in the storage unit 491. As a result, the registration key EK is retained in the storage unit 491.

Note that the accepting unit 410 may not perform the process in this step if the storage unit 491 has already retained the registration key EK.
(Step S402: Index Length Accepting Process)
The accepting unit 410 accepts an index length ILEN.
As a specific example, the accepting unit 410 accepts, via the input/output interface 404, the index length ILEN inputted to the index disclosure key device 400. The accepting unit 410 may accept the index length ILEN from an application program.

The index length ILEN is an integer equal to or more than 1, and has a value of the data length of the index I generated in the registration device 600 being represented in units of bytes. As a specific example, when ILEN=32, the data length of the index I has a value of 32 bytes or in proportion to 32 bytes.

Note that the accepting unit 410 may not perform the process in this step if the storage unit 491 has already stored the index length ILEN.

(Step S403: Generation Process)

The index disclosure key generation unit 421 generates the index disclosure key IK by using the tag key TK and the index length ILEN.

The index disclosure key IK has index disclosure partial keys $IK\_j$ of the number of ILEN. Part of the index disclosure key IK may be referred to as the index disclosure key IK. j is an integer equal to or more than 1 and equal to or less than ILEN. That is, the index disclosure key IK may be represented in vector form as follows.

$$IK=(IK\_1, \ldots, IK\_ILEN)$$

The index disclosure key generation unit 421 calculates the index disclosure partial key $IK\_j$ as follows.

First, the index disclosure key generation unit 421 concatenates the tag key TK and the number j together to obtain a concatenated value TK|j. x|y represents a value represented by a bit string of data having a bit string of data x and a bit string of data y concatenated together. Concatenating means concatenating bit strings, unless otherwise specified.

Next, the index disclosure key generation unit 421 executes a function F_1 by taking the concatenated value TK|j as an input to obtain the index disclosure partial key $IK\_j$. That is, the index disclosure partial key $IK\_j$ may be represented as follows.

$$IK\_j=F\_1(TK|j)$$

The function F_1 may be any one-way function. Specific examples of the one-way function include a pseudorandom function, a hash function, common key cryptography, or public key cryptography.

(Step S404: Retention Process)

The generation unit 420 causes the index disclosure key IK to be stored in the storage unit 491. As a result, the index disclosure key IK is retained in the storage unit 491.

(Step S405: Output Process)

The output unit 430 outputs the index disclosure key IK.

As a specific example, the output unit 430 transmits the index disclosure key IK to the registration device 600 by using the communication device 405.

Figure 18:
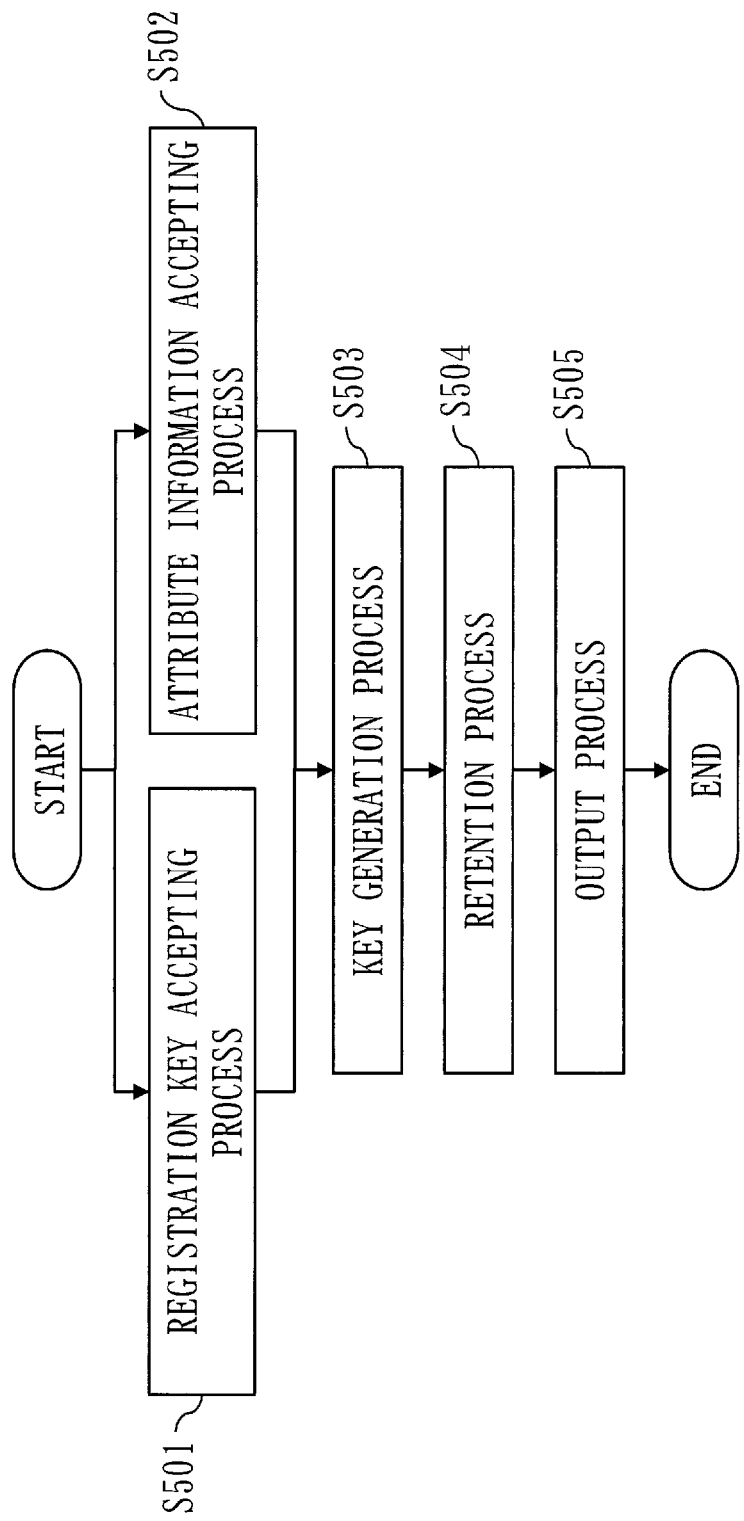
FIG. 18 is a flowchart illustrating operation of a user key generation process in Embodiment 1.

FIG. 18 is a flowchart illustrating one example of a user key generation process.

The user key generation process is a process to be performed by the user key device 500.

(Step S501: Registration Key Accepting Process)

The accepting unit 510 accepts the registration key EK.

As a specific example, the accepting unit 510 receives the registration key EK from the registration key device 300 by using the communication device 505. The accepting unit 510 may accept, via the input/output interface 504, the registration key EK inputted to the user key device 500.

The accepting unit 510 causes the registration key EK to be stored in the storage unit 591. As a result, the registration key EK is retained in the storage unit 591.

The accepting unit 510 may not perform the process in this step if the storage unit 591 has already retained the registration key EK.

(Step S502: Attribute Information Accepting Process)

The accepting unit 510 accepts attribute information A. The attribute information A corresponds to the searcher attribute information.

As a specific example, the accepting unit 510 accepts, via the input/output interface 504, the attribute information A inputted to the user key device 500. The accepting unit 510 may accept the attribute information A from an application program.

Note that the accepting unit 510 may not perform the process in this step if the storage unit 591 has already stored the attribute information A.

The attribute information is information with attributes of the searcher consolidated therein. The attribute information is information regarding authority control for searching and decoding. The searcher is a user who can search for data registered in the data management device 800. That is, the searcher is a user of the search operation device 700 or a person who possibly uses the search operation device 700. The searcher may not be human, such as a computer or robot. The attributes of the searcher include properties of the searcher, identification information of the searcher, and so forth.

As a specific example, the attributes of the searcher are formed of one or more layers. In the following, it is assumed that the attributes of the searcher are formed of one or more layers.

The attribute information indicates an attribute value of each searcher by each layer. The attribute value is each value of the attribute information.

FIG. 19 illustrates a specific example of the attribute information. In this example, the attribute of the searcher is formed of four layers. In the following, the example is described.

One number corresponds to one class of the searcher. One number may correspond to a plurality of searchers.

An attribute of a first layer (first attribute) indicates a division the searcher belongs to.

An attribute of a second layer (second attribute) indicates a department the searcher belongs to.

An attribute of a third layer (third attribute) indicates a section the searcher belongs to.

An attribute of a fourth layer (fourth attribute) indicates the name of the searcher.

Attribute information with number 1 is attribute information of Mr. Ne. Mr. Ne belongs to Sc section of De department of Di division.

Attribute information with number 2 is attribute information of Mrs. Nf. Mrs. Nf belongs to Sd section of De department of Di division.

Attribute information with number 3 corresponds to the searcher who belongs to Sc section of De department of Di division. The fourth attribute with number 3 is a wildcard *. The wildcard * represents that the attribute value is not limited. Thus, the attribute information corresponding to number 3 indicates that the name of the searcher is not limited. Note that the wildcard * can be replaced in a computer by a value with all bits being 1, a character code of *, or the like.

Attribute information with number 4 corresponds to a searcher who belongs to De department of Di division. The third attribute and the fourth attribute with number 4 are wildcards *. Thus, the attribute information corresponding to number 4 indicates that the section and name of the searcher are not limited.

In the present embodiment, the attribute information of the searcher is formed of L layer(s). L is an integer equal to or more than 1.

The attribute information A may be represented as follows.

$$A=(A\_1,\ldots,A\_L)$$

(Step S503: Key Generation Process)

The user key generation unit 521 generates a user data key UDK by using the data key DK and the attribute information A.

The user data key UDK has, as a specific example, a user data partial key UDK_j and a flag value Db_j. j is an integer equal to or more than 1 and equal to or less than L.

As a specific example, the user key generation unit 521 calculates the user data attribute partial key UDK_j as follows.

First, the user key generation unit 521 concatenates an attribute value A_j and the number j together to obtain a concatenated value A_j|j.

Next, the user key generation unit 521 executes a function F_2 by taking the data key DK and the concatenated value A_j|j as inputs to obtain the user data key UDK_j. The function F_2 may be any one-way function.

The user key generation unit 521 finds the flag value Db_j as follows.

The user key generation unit 521 determines whether the attribute value A_j is a wildcard *.

The user key generation unit 521 sets the flag value DB_j as 1 when the attribute value A_j is a wildcard *.

The user key generation unit 521 sets the flag value DB_j as 0 when the attribute value A_j is not a wildcard *.

The user data key UDK may be represented as follows.

$$UDK=((UDK\_1,Db\_1),\ldots,(UDK\_L,Db\_L))$$

$$Db\_j=1(\text{when } A\_j=*)$$

$$Db\_j=0(\text{when } A\_j\neq *)$$

$$UDK\_j=F\_2(DK,A\_j|j)$$

The user key generation unit 521 generates a user tag key UTK by using the tag key TK and the attribute information A. The user tag key UTK has, as a specific example, a user tag partial key UTK_j and a flag value Tb_j.

As a specific example, the user key generation unit 521 generates the user tag key UTK by using a function G_1. The function G_1 is, as a specific example, a pseudorandom function, a hash function, a function of common key cryptography using encryption mode ECB (Electronic Code-Book). The function G_1 corresponds to the user key function.

$$UTK=((UTK\_1,Tb\_1),\ldots,(UTK\_L,Tb\_L))$$

$$Tb\_j=1(\text{when } A\_j=*)$$

$$Tb\_j=0(\text{when } A\_j\neq *)$$

$$UTK\_j=G\_1(TK,A\_j|j)$$

(Step S504: Retention Process)

The generation unit 520 causes the user key UK to be stored in the storage unit 591. As a result, the user key UK is retained in the storage unit 591.

The user key UK is a set of the user data key UDK and the user tag key UTK. The user key UK is a key having the attribute information A incorporated therein.

The user key UK may be represented as follows. Part of the user key UK may be referred to as the user key UK.

$$UK=(UDK,UTK)$$

(Step S505: Output Process)

The output unit 530 outputs the user key UK.

As a specific example, the output unit 530 transmits the user key UK to the search operation device 700 by using the communication device 505.

Figure 20:
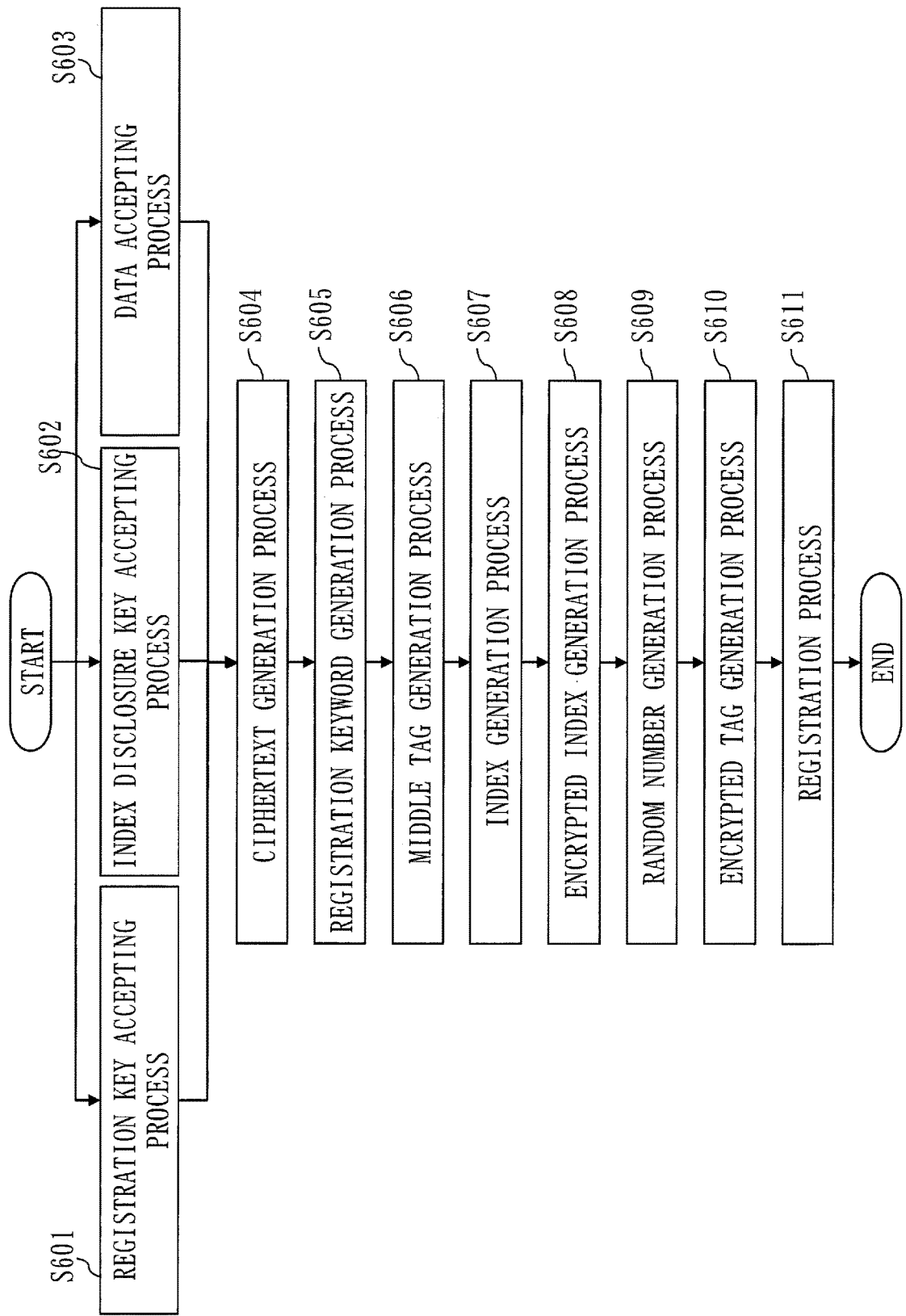
FIG. 20 is a flowchart illustrating operation of a data registration process in Embodiment 1.

FIG. 20 is a flowchart illustrating one example of operation of a data registration process.

The data registration process is a process to be performed by the registration device 600 and the data management device 800.

(Step S601: Registration Key Accepting Process)

The accepting unit 610 accepts the registration key EK.

As a specific example, the accepting unit 610 receives the registration key EK from the registration key device 300 by using the communication device 605. The accepting unit 610 may accept, via the input/output interface 604, the registration key EK inputted to the registration device 600.

The accepting unit 610 causes the registration key EK to be stored in the storage unit 691. As a result, the registration key EK is retained in the storage unit 691.

In place of the process in this step, the accepting unit 610 may perform a process with the registration key EK in this step read as the tag key TK.

Note that the accepting unit 610 may not perform the process in this step if the storage unit 691 has already retained the registration key EK.

(Step S602: Index Disclosure Key Accepting Process)

The accepting unit 610 accepts the index disclosure key IK.

As a specific example, the accepting unit 610 receives the index disclosure key IK from the index disclosure key device 400 by using the communication device 605. The accepting unit 610 may accept, via the input/output interface 604, the index disclosure key IK inputted to the registration device 600.

The accepting unit 610 causes the index disclosure key IK to be stored in the storage unit 691. The index disclosure key IK is stored in the storage unit 691.

Note that the accepting unit 610 may not perform the process in this step if the storage unit 691 has already retained the index disclosure key IK.

(Step S603: Data Accepting Process)

The accepting unit 610 accepts a plaintext M and attribute information B. The plaintext M corresponds to registration data. The registration data is data registered in the data management device 800. The plaintext M is, typically, unencrypted data. The plaintext M includes a file name File(M) as metadata. The file name File(M) may be encrypted. The attribute information B corresponds to authorized-person attribute information.

As a specific example, the accepting unit 610 accepts, via the input/output interface 604, the plaintext M and the attribute information B inputted to the registration device 600. The accepting unit 610 may accept the plaintext M and the attribute information B from an application program.

The attribute information B is attribute information about the authorized person, and indicates an attribute value of each layer of the authorized person. As with the attribute information A, the attribute information B is information regarding authority control for searching and decoding.

The authorized person is a user who has an authority to refer to the plaintext M. That is, the authorized person is part of searchers.

As a specific example, as with the attribute information A, the attribute information B may be represented as follows.

$$B=(B\_1,\ldots,B\_L)$$

(Step S604: Ciphertext Generation Process)

The ciphertext data generation unit 621 generates ciphertext data C by using the data key DK, the plaintext M, and the attribute information B. The ciphertext data C includes the file name File(M) as metadata of the plaintext M.

As a specific example, the ciphertext data generation unit 621 generates ciphertext data C by using a scheme of cryptography disclosed in Reference Literature 1 or a scheme of generating attribute-based encryption such as ID-based encryption.

[Reference Literature 1] WO 2019/053788 A1

(Step S605: Registration Keyword Generation Process)

The keyword generation unit 622 generates the registration keyword W corresponding to the plaintext M. The registration keyword W is a keyword generated in this step. The keyword generation unit 622 may generate one keyword as a registration keyword W or may generate a plurality of keywords as registration keywords W.

As a specific example, when the plaintext M includes a name, the keyword generation unit 622 generates the name as it is as one keyword. Also, when the plaintext M is a sentence, the keyword generation unit 622 may perform morphological analysis or natural language processing on that sentence and generate a plurality of keywords by using the results.

The keyword generation unit 622 may accept, via the input/output interface 604, a keyword inputted to the registration device 600. Also, the keyword generation unit 622 may accept a keyword from an application program.

In the following, for the sake of simplification, it is assumed that the keyword generation unit 622 generates one keyword. When the keyword generation unit 622 generates a plurality of keywords, the registration device 600 repeatedly performs the following process by the number of times equal to the number of keywords, thereby generating encrypted tags CT, the encrypted indexes EI, and so forth as many as the number of generated keywords.

(Step S606: Middle Tag Generation Process)

The middle tag generation unit 623 generates the middle tag MT by using the tag key TK, the attribute information B, and the registration keyword W. The middle tag MT is deterministic data obtained as a result of executing a deterministic function by taking the tag key TK, the attribute information B, and the registration keyword W as inputs. The deterministic function is a function in which if the input value is any value which belongs to the domain of definition of the deterministic function, the output value corresponding to the input value is always the same. The deterministic function is a function in which the output value is not probabilistically defined. That is, the middle tag MT generated by using the same registration keyword W always has the same value. The deterministic data is data obtained by executing a deterministic function. That is, the deterministic data is not probabilistically determined data.

The middle tag MT corresponds to temporary data for use in generating the encrypted tag CT calculated by the encrypted tag generation unit 627.

The middle tag MT is generated as follows by using the deterministic function D_1.

$$MT = D\_1(TK, B, W)$$

Here, the middle tag MT is described based on the example of Reference Literature 1.

The middle tag MT has an attribute element MT_{j, 0, W} and a wildcard element MT_{j, 1, W}. j is an integer equal to or more than 1 and equal to or less than L. Here, the number of attribute elements and the number of wildcard elements are each L. Thus, the middle tag MT has 2 L elements. The middle tag MT corresponds to one authorized person.

The middle tag generation unit 623 calculates the attribute element MT_{j, 0, W} as follows.

First, the middle tag generation unit 623 concatenates an attribute value B_j and the number j together to obtain a concatenated value B_j|j.

Next, the middle tag generation unit 623 executes the function G_1 by taking the tag key TK and the concatenated value B_j|j as inputs to obtain a function value B_j^.

Next, the middle tag generation unit 623 executes a function G_2 by taking the function value B_j^ and the registration keyword W as inputs to obtain a function value B_j^^.

The function value B_j^^ is the attribute element MT_{j, 0, W}.

Note that the function G_2 is equivalent to the function G_1. The function G_2 corresponds to the search query function.

The middle tag generation unit 623 calculates the wildcard element MT_{j, 1, W} as follows.

First, the middle tag generation unit 623 concatenates the wildcard * and the number j together to obtain a concatenated value *_j.

Next, the middle tag generation unit 623 executes the function G_1 by taking the tag key TK and the concatenated value *_j as inputs to obtain a function value *_j^.

Next the middle tag generation unit 623 executes the function G_2 by taking the function value *_j^ and the registration keyword W as inputs to obtain a function value *_j^^. The function value *_j^^ is the wildcard element MT_{j, 1, W}.

The middle tag MT may be represented as follows.

$$MT = (MT\_\{1,0,W\}, MT\_\{1,1,W\}, \ldots, MT\_\{L,0,W\}, MT\_\{L,1,W\})$$

$$MT\_\{j,0,W\} = (G\_2(G\_1(TK, B\_j|j), W)$$

$$MT\_\{j,1,W\} = (G\_2(G\_1(TK, *|j), W)$$

j is an integer equal to or more than 1 and equal to or less than L.

(Step S607: Index Generation Process)

The index generation unit 624 generates the index I by using the middle tag MT.

The index generation unit 624 executes a deterministic function by taking the middle tag MT as an input, and takes the result of executing the deterministic function as the index I. That is, the index I is deterministic data.

The index I is data for use before the searching unit 840 performs a search process. The index I is data for use by the searching unit 840 in checking whether there is a possibility that the registration keyword W included in the encrypted tag CT and the search keyword w included in the search query SQ match.

The index I is more specifically described.

The data management device 800 compares the index I and the index query IQ to determine at high speed whether there is a possibility that the registration keyword W and the search keyword w match. Here, the index query IQ is a query generated by the index query generation unit 722 so as to correspond to the search query SQ. Part of the index query IQ may be referred to as the index query IQ. The registration keyword W is included in the encrypted tag CT. The search keyword w is included in the search query.

When it is determined that there is a possibility that the registration keyword W and the search keyword w match, the encrypted tag collating unit 843 performs a process of collating the encrypted tag CT and the search query SQ with each other (hereinafter, a collating process). On the other hand, when it is determined that there is not a possibility that registration keyword W and the search keyword w match, the encrypted tag collating unit 843 does not perform a collating process.

Generally, the time required for the collating process is long. Thus, it is desirable for the data management device 800 not to perform an unnecessary collating process.

In the collating process, the data management device 800 does not collate the search query SQ with all encrypted tags CT retained in the data management device 800. Instead, the data management device 800 uses the index I and the index query IQ, thereby narrowing down the encrypted tags CT with a possibility of including the registration keyword W matching the search keyword w and performing a collating process by using the narrowed-down encrypted tags CT. Thus, the data management device 800 can reduce the time required for searching for the encrypted tag CT.

The index I is generated as follows by using a deterministic function D_2. The deterministic function D_2 corresponds to the index query function.

$$I = D\_2(MT) = (I\_1, \ldots, I\_ILEN)$$

The deterministic function D_2 outputs a vector value having the length ILEN.

For example, it is assumed that, for the registration keyword W=Tokyo, by a deterministic function D_2' internally used by the deterministic function D_2, middle tags MT=(MT_{1, 0, W}, MT_{1, 1, W}, ..., MT_{L, 0, W}, MT_{L, 1, W}) are converted as follows.

$$D\_2'(MT\_\{1, 0, Tokyo\}) = 10 \ldots 01 \ldots 1$$

$$D\_2'(MT\_\{1, 1, Tokyo\}) = 00 \ldots 11 \ldots 0$$

...

$$D\_2'(MT\_\{L, 0, Tokyo\}) = 00 \ldots 01 \ldots 0$$

$$D\_2'(MT\_\{L, 1, Tokyo\}) = 11 \ldots 10 \ldots 0$$

Here, the index I is configured as follows, as a specific example.

$$I = (I\_1, \ldots, I\_ILEN)$$

$$I\_1 = (I\_10\_1, I\_11\_1, \ldots, I\_L0\_1, I\_L1\_1) = (1, 0, \ldots, 0, 1)$$

$$I\_2 = (I\_10\_2, I\_11\_2, \ldots, I\_L0\_2, I\_L1\_2) = (0, 0, \ldots, 0, 1)$$

...

$$I\_ILEN = (I\_10\_ILEN, I\_11\_ILEN, \ldots, I\_L0\_ILEN, I\_L1\_ILEN) =$$

$$(0, 1, \ldots, 0, 1)$$

That is, I_1 is configured of the first bit of D_2'(MT_{1, 0, Tokyo}), . . . , D_2'(MT_{L, 1, Tokyo}). Similarly, I_ILEN is configured of the ILEN-th bit of D_2'(MT_{1, 0, Tokyo}), . . . , D_2'(MT_{L, 1, Tokyo}).

The above-described structure of the index I is one example. The index I may have another structure. For example, I_1 is configured of the first bit and the second bit of D_2'(MT_{1, 0, Tokyo}), . . . , D_2'(MT_{L, 1, Tokyo}). Similarly, I_ILEN is configured of the (2×ILEN-1)-th bit and (2×ILEN)-th bit of D_2'(MT_{1, 0, Tokyo}), . . . , D_2'(MT_{L, 1, Tokyo}). The index may be configured in this manner.

When the middle tag MT is deterministically and safely generated with an encryption function, the index I may be configured by using the head one bit to the ILEN-th bit of the middle tag MT. That is, the middle tag MT may be configured as described below.

$$D\_2'(MT\_\{j,b,Tokyo\}) = MT\_\{j,b,Tokyo\} =$$
$$(I\_jb\_1, \ldots, I\_jb\_ILEN, *\_(ILEN+1), \ldots))$$

j is an integer equal to or more than 1 and equal to or less than ILEN. b is 0 or 1. Note that in this case, the index generation unit 624 generates the index I by ignoring an (ILEN+1)-th vector element value onward of the middle tag MT.

(Step S608: Encrypted Index Generation Process)

The encrypted index generation unit 625 generates the encrypted index EI by encrypting the index I by using the index disclosure key IK.

The encrypted index generation unit 625 generates the encrypted index EI by using a probabilistic encryption function such as AES-CTR (Advanced Encryption Standard-Counter) or RSA (registered trademark)-OAEP (Rivest-Shamir-Adleman-Optimal Asymmetric Encryption Padding). In probabilistic encryption, when the same data as before is encrypted, the same encrypted data is not necessarily generated.

As a specific example, the encrypted index generation unit 625 generates the encrypted index EI as follows by using a probabilistic encryption function Enc.

$$EI = (EI\_1, \ldots, EI\_ILEN)$$

$$EI\_1 = Enc(IK\_1, I\_1)$$

...

$$EI\_ILEN = Enc(IK\_ILEN, I\_ILEN)$$

(Step S609: Random Number Generation Process)

The random number generation unit 626 generates a random number TR. The random number TR corresponds to the encrypted tag random number. At least one element of the random numbers TR may be referred to as an encrypted tag random number. The random number generation unit 626 may generate the random number TR in any manner. The random number TR may be a vector formed of random number elements. As a specific example, the random number generation unit 626 generates a vector formed of uniform random number elements as the random number TR.

The random number generation unit 626 may generate one random number TR with a scheme for use by the encrypted tag generation unit 627 in generating the encrypted tag CT. The random number generation unit 626 may generate TR formed of a plurality of random numbers.

In the following, description is made by assuming that TR=(R_0, R_1, . . . , R_L) holds, in which the random number generation unit 626 generates the random number TR formed of L+1 random numbers.

(Step S610: Encrypted Tag Generation Process)

The encrypted tag generation unit 627 generates the encrypted tag CT by using the tag key TK, the middle tag MT, and the random number TR.

As a specific example, the encrypted tag generation unit 627 generates the encrypted tag CT as follows for the middle tag MT=(MT_{1, 0, W}, MT_{1, 1, W}, ..., MT_{L, 0, W}, MT_{L, 1, W}) by using a function G_3 and a function G_4. The function G_3 and the function G_4 are deterministic functions. The function G_3 corresponds to the encrypted tag function. The function G_4 corresponds to a collator function. In the following expressions, VER and R_0 are coupled to the encrypted tag CT.

$$CT=(CT\_\{1,0,W\}, CT\_\{1,1,W\}, \ldots, CT\_\{L,0,W\}, CT\_\{L,1,W\}, VER, R\_0)$$

$$CT\_\{j,0,W\} = G\_3(G\_2(G\_1(TK, B\_j|j), W)|R\_0) + R\_j$$

$$CT\_\{j,1,W\} = G\_3(G\_2(G\_1(TK, *|j), W)|R\_0) + R\_j$$

$$VER = G\_4(R\_1 + \ldots + R\_L)$$

j is an integer equal to or more than 1 and equal to or less than L. VER corresponds to an encrypted tag collator.

In the specification, a sign "+" represents exclusive-OR, unless otherwise specified. However, when a term before and after + is not a character but a numeral, the sign represents addition, unless otherwise specified.

(Step S611: Registration Process)

The registration unit 630 registers a set of the ciphertext data C, the encrypted tag CT, and the encrypted index EI in the data management device 800.

As a specific example, the registration unit 630 transmits a set of the ciphertext data C, the encrypted tag CT, and the encrypted index EI to the data management device 800 by using the communication device 605.

The accepting unit 810 receives a set of the ciphertext data C, the encrypted tag CT, and the encrypted index EI, and causes the received set to be stored in the storage unit 891. That is, the accepting unit 810 causes the ciphertext data C, the encrypted tag CT, and the encrypted index EI to be stored in the storage unit 891 as being associated with one another. As a result, the set of the ciphertext data C, the encrypted tag CT, and the encrypted index EI is retained in the storage unit 891.

FIG. 21 illustrates an example of a registration database 892.

The data management device 800 registers the file name, the ciphertext data C, the encrypted tag CT, and the encrypted index EI in association with one another in the registration database 892.

The storage unit 891 has the registration database 892 stored therein.

Figure 22:
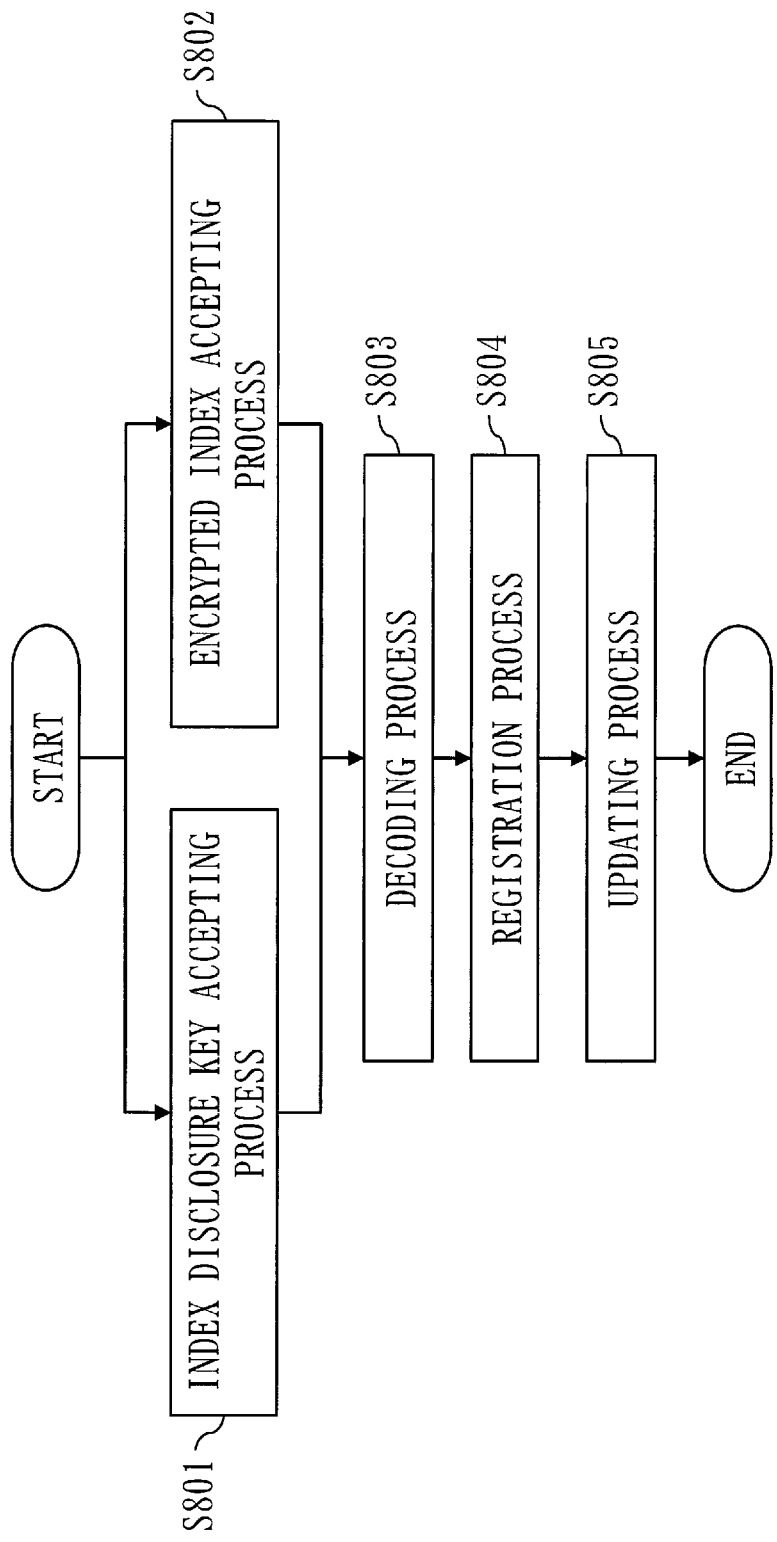
FIG. 22 is a flowchart illustrating operation of an index disclosure process in Embodiment 1.

FIG. 22 is a flowchart illustrating one example of an index disclosure process.

The index disclosure process is a process to be performed by the data management device 800. The present process is performed on the encrypted index EI retained in the storage unit 891 when an i-th index disclosure key IK_i, which is part of the index disclosure key IK, is newly disclosed. i is an integer equal to or more than 1 and equal to or less than ILEN. When a data registration process is newly performed after IK_i is disclosed, the present process may be performed on the encrypted index EI immediately after retained in the storage unit 891 at step S611.

(Step S801: Index Disclosure Key Accepting Process)

The accepting unit 810 accepts the i-th index disclosure key IK_i of the index disclosure key IK. i is an integer equal to or more than 1 and equal to or less than ILEN.

As a specific example, the accepting unit 810 receives the i-th index disclosure key IK_i of the index disclosure key from the index disclosure key device 400 by using the communication device 805. The accepting unit 810 may accept, via the input/output interface 804, the i-th index disclosure key IK_i inputted to the data management device 800.

The accepting unit 810 causes the i-th index disclosure key IK_i to be stored in the storage unit 891. As a result, the i-th index disclosure key IK_i is retained in the storage unit 891.

Note that the accepting unit 810 may not perform the process in this step if the storage unit 891 has already retained the i-th index disclosure key IK_i.

(Step S802: Encrypted Index Accepting Process)

The accepting unit 810 accepts the encrypted index EI.

As a specific example, the accepting unit 810 accepts, via the input/output interface 804, the encrypted index EI inputted to the data management device 800. The accepting unit 810 may accept the encrypted index EI from an application program.

The encrypted index EI retained in the storage unit 891, the encrypted index EI immediately after retained in the storage unit 891 at step S611, or the like corresponds to the encrypted index EI in this step.

Note that the accepting unit 810 may not perform the process in this step if the storage unit 891 has already retained the encrypted index EI.

(Step S803: Decoding Process)

The encrypted index decoding unit 821 decodes an i-th encrypted index EI_i by using an i-th index disclosure key IK_i, thereby reconstructing an i-th index I_i. The i-th encrypted index EI_i is part of the encrypted index EI. The i-th index I_i is part of the index I.

That is, the encrypted index decoding unit 821 reconstructs I_i as follows by using a decoding function Dec. The decoding function Dec. is a function corresponding to the probabilistic encryption function Enc.

$$I\_i = Dec(IK\_i, EI\_i)$$

(Step S804: Registration Process)

The registration unit 830 registers the i-th index I_i and the encrypted index EI in association with each other in the registration database 892.

FIG. 23 illustrates an example of a post-index-disclosure database 893. The post-index-disclosure database 893 is described by assuming i=1.

The data management device 800 registers the extracted encrypted index EI and the reconstructed first index I_1 in association with each other. The registration database 892 is updated in a manner as that of the post-index-disclosure database 893.

In the post-index-disclosure database 893 of this drawing, the first encrypted index EI_1 is not registered. However, the registration unit 830 may not delete the first encrypted index EI_1 from the registration database 892.

The storage unit 891 has the post-index-disclosure database 893 stored therein.

Note that the data management device 800 uses high-speed index technique when registering a string of the i-th index I_i, thereby causing the data search process to be performed at high speeds. The high-speed index technique is, as a specific example, a binary search tree or B-TREE.

(Step S805: Updating Process)

The registration unit 830 updates the index disclosure position information Pos stored in the storage unit 891. The index disclosure position information Pos is information indicating the position of the index I corresponding to the index disclosure key currently published. The index disclosure position information Pos is typically data created immediately after the searchable encryption system 100 starts operation. Here, the index disclosure position information Pos is a set, and the initial value of the index disclosure position information Pos is an empty set. The index disclosure key IK is published typically by the registration device 600.

For example, when the first index disclosure key IK_1 is published for the first time, the registration unit 830 adds 1 to Pos. That is, the registration unit 830 updates the index disclosure position information to Pos={1}. Then, when the second index disclosure key IK_2 is published, the registration unit 830 adds 2 to Pos. That is, the registration unit 830 updates the index disclosure position information to Pos={1, 2}.

Figure 24:
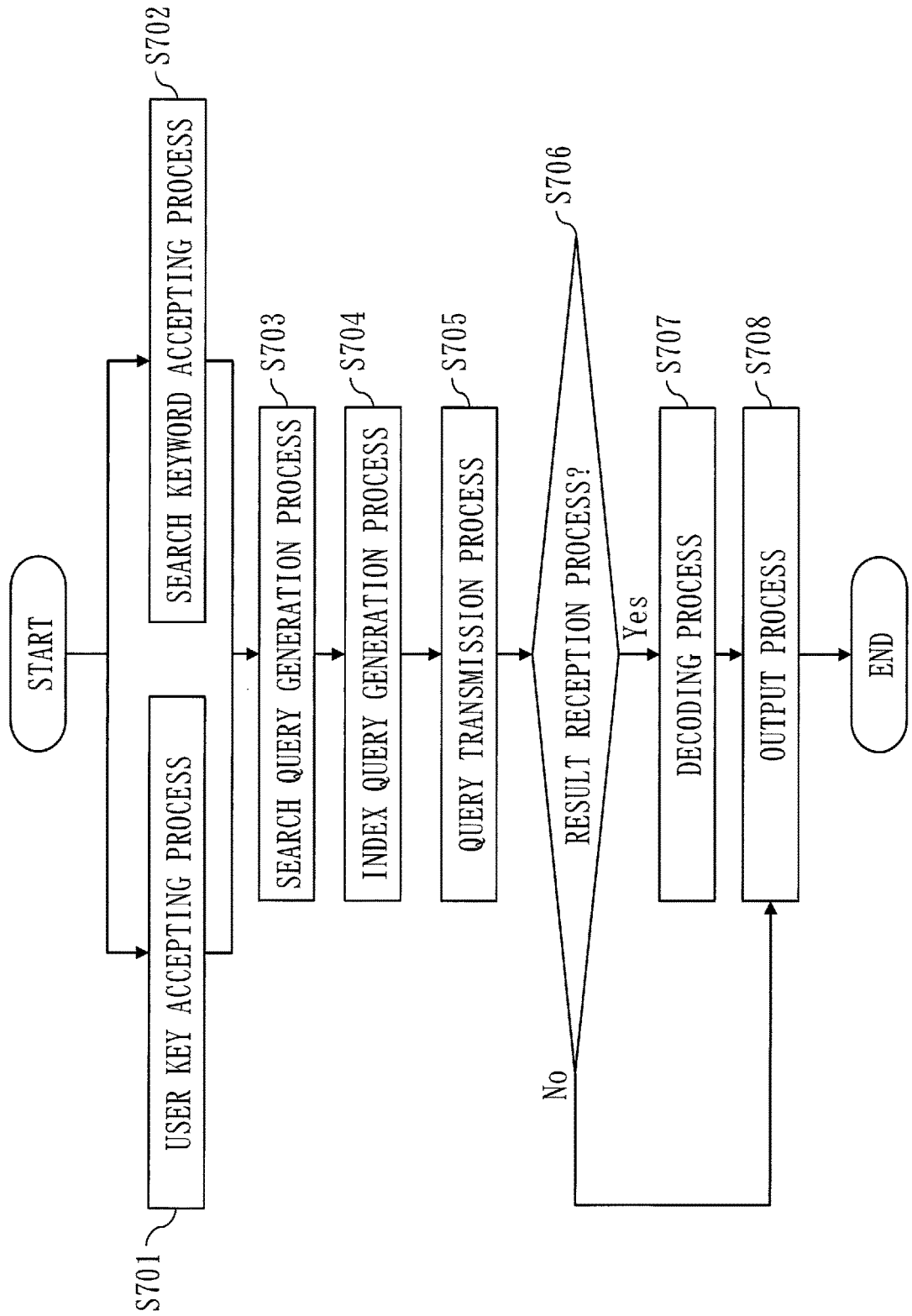
FIG. 24 is a flowchart illustrating operation of a search operation process in Embodiment 1.

FIG. 24 is a flowchart illustrating one example of a search operation process.

The search operation process is a process to be performed by the search operation device 700.

(Step S701: User Key Accepting Process)

The accepting unit 710 accepts the user key UK.

As a specific example, the accepting unit 710 receives the user key UK from the user key device 500 by using the communication device 705. The accepting unit 710 may accept, via the input/output interface 704, the user key UK inputted to the search operation device 700.

The accepting unit 710 causes the user key UK to be stored in the storage unit 791. As a result, the user key UK is retained in the storage unit 791.

The user key UK includes the user data key UDK and the user tag key UTK.

Note that the accepting unit 710 may not perform the process in this step if the storage unit 791 has already retained the user key UK.

(Step S702: Search Keyword Accepting Process)

The accepting unit 710 accepts the search keyword w.

As a specific example, the accepting unit 710 accepts, via the input/output interface 704, the search keyword w inputted to the search operation device 700. The accepting unit 710 may accept the search keyword w from an application program.

(Step S703: Search Query Generation Process)

The search query generation unit 721 generates the search query SQ by using the user tag key UTK and the search keyword w.

As a specific example, the search query generation unit 721 generates the search query SQ as follows by using UTK=((UTK_1, Tb_1), . . . , (UTK_L, Tb_L)) and a function G_2.

$$SQ=((SQ\_1, Qb\_1), \ldots, (SQ\_L, Qb\_L))$$

$$Qb\_j = Tb\_j$$

$$SQ\_j = G\_2(UTK\_j, w)$$

j is an integer equal to or more than 1 and equal to or less than L.

(Step S704: Index Query Generation Process)

The index query generation unit 722 generates the index query IQ by using the search query SQ. The index query IQ is deterministic data obtained as a result of executing the deterministic function D_2 by taking the search query SQ as an input. The index query IQ is data for use in searching for the index I retained in the storage unit 891.

The searching unit 840 searches for the index I by using the index query IQ before performing a collating process on the encrypted tag CT and the search query SQ. The searching unit 840 checks whether there is a possibility that the registration keyword W and the search keyword w match and the attribute information A and the attribute information B match. Here, information about the registration keyword W and the attribute information A is included in the encrypted tag CT. Information about the search keyword w and the attribute information B is included in the index query IQ.

When the searching unit 840 determines that there is a possibility that the registration keyword W and the search keyword w match and the attribute information A and the attribute information B match, the encrypted tag collating unit 843 performs a collating process by using the encrypted tag CT and the search query SQ. On the other hand, otherwise, the encrypted tag collating unit 843 does not perform a collating process.

The index query IQ is generated as follows by using the deterministic function D_2.

$$IQ = D\_2(SQ) = (IQ\_1, \ldots, IQ\_ILEN)$$

As a specific example, when the search keyword w is Tokyo, the index query IQ is configured as follows by using the search query SQ and the deterministic function D_2. MT_{j, Qb_j, w} is a middle tag. The middle tag in the search operation device 700 may differ from the middle tag in the registration device 600.

$$D\_2'(MT\_\{1, Qb\_1, Tokyo\}) = D\_2'(SQ\_1)$$

...

$$D\_2'(MT\_\{L, Qb\_L, Tokyo\}) = D\_2'(SQ\_L)$$

and $$IQ\_j = (IQ\_1\_j, \ldots, IQ\_L\_j) = (I\_1(Qb\_1)\_j, \ldots, I\_L(Qb\_L)\_j)$$

j is an integer equal to or more than 1 and equal to or less than L.

When Qb_1= . . . =Qb_L=0, the above example is represented as follows.

$$D\_2'(SQ\_1) = D\_2'(MT\_\{1, 0, Tokyo\}) = 1 \ldots 01 \ldots 1$$

...

$$D\_2'(SQ\_L) = D\_2'(MT\_\{L, 0, Tokyo\}) = 0 \ldots 01 \ldots 0$$

and $$I\_10\_1 = IQ\_1\_1 = 1$$

...

$$I\_L0\_1 = IQ\_L\_1 = 0$$

...

$$I\_10\_ILEN = IQ\_1\_ILEN = 0$$

...

$$I\_L0\_ILEN = IQ\_L\_ILEN = 0$$

Here, I_1[Qb_1, . . . , Qb_L] is defined as follows.

$$I\_1[Qb\_1, \ldots, Qb\_L] = (I\_1(Qb\_1)\_1, \ldots, I\_L(Qb\_1)\_1)$$

In the above example, I_1[Qb_1, Qb_L] can be represented as I_1[0, . . . , 0]=(1, . . . , 0).

When the registration keyword W and the search keyword w match and the attribute information A and the attribute information B match, a value obtained by extracting the first index I_1 of the registration keyword W in view of Qb_1, . . . , Qb_L (that is, I_1[Qb_1, . . . , Qb_L]) and the value of IQ_1 always match.

In this case, similarly, also for the integer j equal to or more than 1 and equal to or less than ILEN, I_j[Qb_1, . . . , Qb_L]=IQ_j holds for a j-th index I_j of the registration keyword W.

From the above contraposition, if I_j[Qb_1, . . . , Qb_L]≠IQ_j, it can be said that at least the registration keyword W and the search keyword w do not match or the attribute information A and the attribute information B do not match.

Note that when at least the registration keyword W and the search keyword w do not match or the attribute information A and the attribute information B do not match, there is a possibility that I_j[Qb_1, . . . , Qb_L]=IQ_j holds. However, that possibility is sufficiently low.

Thus, by using the above fact, the index collating unit 841 can conduct simple checking for matching as follows. The index collating unit 841 checks whether I_j[Qb_1, . . . , Qb_L]=IQ_j holds for all j equal to or more than 1 and equal to or less than k. k is the number of elements of the index disclosure position information Pos.

When this expression holds for all j, there is a possibility that the registration keyword W and the search keyword w match and the attribute information A and the attribute information B match. Thus, in this case, the searching unit 840 collates the encrypted tag CT and the search query SQ with each other.

On the other hand, when this expression does not hold for all j, at least the registration keyword W and the search keyword w do not match or the attribute information A and the attribute information B do not match. Therefore, the searching unit 840 does not collate the encrypted tag CT and the search query SQ with each other.

In this manner, the searching unit 840 can narrow down the encrypted tags CT to be collated.

(Step S705: Query Transmission Process)

The requesting unit 730 transmits the search query SQ and the index query IQ to the data management device 800 by using the communication device 705.

(Step S706: Result Reception Process)

The requesting unit 730 waits for reception by the communication device 705 of an encrypted search result {C} from the data management device 800. The maximum time for waiting by the requesting unit 730 for reception of the encrypted search result {C} may be any value.

When the communication device 705 receives the encrypted search result {C}, the search operation device 700 proceeds to step S707. Otherwise, the search operation device 700 proceeds to step S708.

The encrypted search result {C} is a set formed of at least one piece of ciphertext data C hit as a result of performing a search process by the data management device 800.

(Step S707: Decoding Process)

The decoding unit 740 decodes each piece of ciphertext data C included in the encrypted search result {C} into the plaintext M by using the user data key UDK.

A set formed of at least one plaintext M obtained by performing this step is referred to as a search result {M}.

Note that when the ciphertext data C is not included in the encrypted search result {C}, that is, when the data management device 800 has failed to extract the ciphertext data C, the decoding unit 740 is not required to perform the process in this step.

(Step S708: Output Process)

The output unit 750 outputs the search result {M}.

As a specific example, the output unit 750 causes the search result {M} to be displayed on the display via the input/output interface 704.

When the search result {M} is not obtained, as a specific example, the output unit 750 displays a message indicating that no plaintext M searched is present or decoding has failed. If the search result {M} is not obtained, this means that there is no possibility that at least the registration keyword W and the search keyword w match or the attribute information A and the attribute information B match, no ciphertext data C searched is present, or the ciphertext data C fails to be decoded into the plaintext M.

Figure 25:
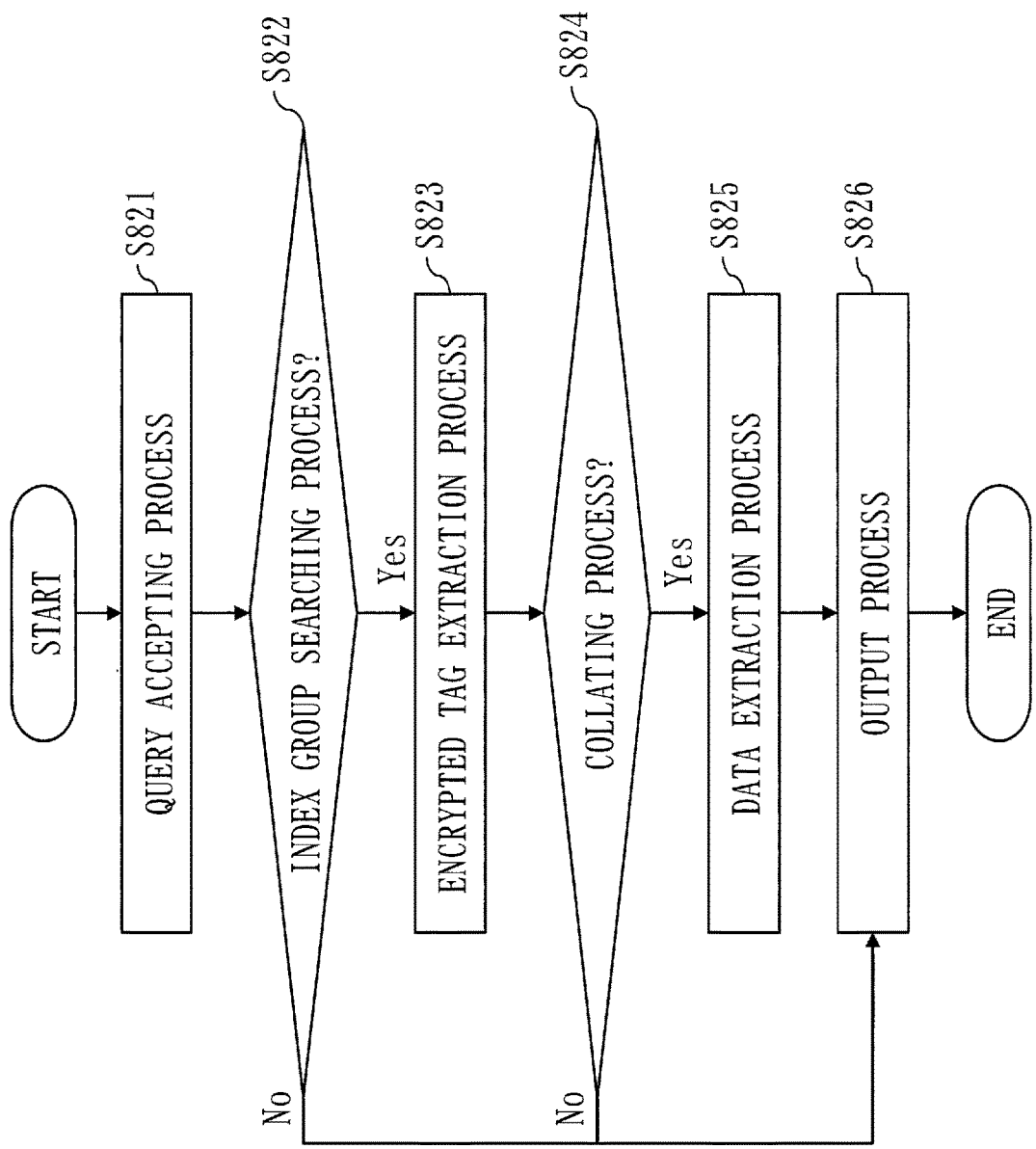
FIG. 25 is a flowchart illustrating operation of a data search process in Embodiment 1.

FIG. 25 is a flowchart illustrating one example of operation of a data search process.

The data search process is a process to be performed by the data management device 800.

(Step S821: Query Accepting Process)

The accepting unit 810 receives the search query SQ and the index query IQ from the search operation device 700 by using the communication device 805.

(Step S822: Index Group Searching Process)

The index collating unit 841 reads a public index group {I'} and the index disclosure position information Pos from the storage unit 891. {I'} is a set formed of at least one index I. Each element of {I'} is represented as Ii'. Ii' and the encrypted index EIi correspond to each encrypted tag CTi. The encrypted tag CTi is an i-th encrypted tag when the encrypted tag generation unit 627 generates a plurality of encrypted tags by using a plurality of different registration keywords W and allocates serial numbers to the respective encrypted tags. Each public index Ii' is formed of a value obtained by decoding the encrypted index.

Then, the index collating unit 841 extracts the partial index query IQ' corresponding to the index disclosure position information Pos to perform checking for matching with the public index group {I'}. The partial index query IQ' is part of the index query IQ.

Here, it is assumed that the index disclosure position information Pos has k elements. That is, the situation is such that k index disclosure keys are published. Here, it is assumed that Pos={i1, . . . , ik} holds. i1, . . . , ik are integers equal to or more than 1 and equal to or less than ILEN. Also, it is assumed that i1< . . . <ik holds.

For each Ii' of the public index group {I'}, the index collating unit 841 checks whether the following expression holds for all integers j equal to or more than 1 and equal to or less than k, by using Qb_1, . . . , Qb_L included in the search query SQ.

$$Ii'\_j[Qb\_1, \ldots, Qb\_L]=IQ\_j$$

When this expression holds for all j, the encrypted tag CTi retained in the storage unit 891 in association with the public index Ii' is extracted at the next step S823. In this case, the data management device 800 proceeds to step S823.

Otherwise, the data management device 800 proceeds to step S826.

Here, at step S804, when a high-speed index technique such as a binary search tree or B-TREE is applied to the public index group {I'}, the process in this step can be checked in a log order of the number of elements of the public index group {I'}. That is, the index collating unit 841 can be process at higher speeds.

For the sake of simplification of description, as a specific example, it is assumed that k=2, i1=1, and i2=2 hold. That is, description is made to a situation in which two-bit disclosure is made as an index. In this example, each public index Ii' is an encrypted index of the first and second ones of each encrypted index EIi.

Here, the partial index query IQ' is extracted from the index disclosure position information Pos as follows.

$$IQ'=(IQ\_1, IQ\_2)$$

$$IQ\_1=(IQ\_1\_1, \ldots, IQ\_L\_1)$$

$$IQ\_2=(IQ\_1\_2, \ldots, IQ\_L\_2)$$

That is, IQ' is one obtained by extracting the first element and the second element of the index query IQ.

Also, it is assumed that the public index group {I'} is a set having N elements. Here, the number of elements of the encrypted tag CT and the encrypted index EI retained in the storage unit 891 is also N.

Here, the public index group {I'} is represented as {I1', ..., IN'}. Here, each public index Ii' is configured of the following values. The index Ii' corresponds to the partial registration keyword index.

$$Ii'=(Ii'\_1, Ii'\_2)$$

$$Ii'\_1=(Ii'\_10\_1, Ii'\_11\_1, \ldots, Ii'\_L0\_1, Ii'\_L1\_1)$$

$$Ii'\_2=(Ii'\_10\_2, Ii'\_11\_2, \ldots, Ii'\_L0\_2, Ii'\_L1\_2)$$

i is an integer equal to or more than 1 and equal to or less than N.

When the search keyword w and the registration keyword W match and the attribute information A and the attribute information B match, the following expressions both hold.

$$Ii'\_1[Qb\_1, \ldots, Qb\_L]=IQ\_1$$

$$Ii'\_2[Qb\_1, \ldots, Qb\_L]=IQ\_2$$

Here, $Qb\_1, \ldots, Qb\_L$ are values included in the search query SQ.

Here, when the above-described example is used, the expressions are as follows.

$$Ii'\_1[0, \ldots, 0]=IQ\_1=(1, \ldots, 0)$$

$$Ii'\_2[0, \ldots, 0]=IQ\_2=(0, \ldots, 0)$$

(Step S823: Encrypted Tag Extraction Process)

The encrypted tag extracting unit 842 extracts the encrypted tag group {CTi} retained in association with the public index group {Ii'} matching the partial index query IQ' at step S822.

Here, it is assumed that the number of elements of the encrypted tag group is n. That is, the encrypted tag group {CTi}={CT1, ..., CTn}.

(Step S824: Collating Process)

The encrypted tag collating unit 843 collates the encrypted tag group {CTi}={CT1, ..., CTn} extracted at step S823 and the search query SQ with each other.

When the encrypted tag collating unit 843 successfully collates the search query SQ and the encrypted tag CTi, the data management device 800 proceeds to step S825. Otherwise, the data management device 800 proceeds to step S826.

As a specific example, the encrypted tag collating unit 843 collates the search query SQ=((SQ_1, Qb_1), ..., (SQ_L, Qb_L)) and each encrypted tag CTi with each other as follows.

For the encrypted tag CTi=(CTi_{1, 0, W}, CTi_{1, 1, W}, ..., CTi_{L, 0, W}, CTi_{L, 1, W}, VER, R_0), the encrypted tag collating unit 843 calculates $R\_1', \ldots, R\_L'$ and VER' as follows by using the function G_3 and the function G_4.

$$R\_j'=CTi\_\{j, Qb\_j, W\}+G\_3(SQ\_j|R\_0)$$

$$VER'=G\_4(R\_1'+ \ldots +R\_L')$$

j is an integer equal to or more than 1 and equal to or less than L.

Note that when VER and VER' are equal, the encrypted tag collating unit 843 determines that the registration keyword W and the search keyword w match. In this case, there is a high possibility that the registration keyword W and the search keyword w match. The registration keyword W is included in the encrypted tag CTi. The search keyword w is included in the search query SQ.

(Step S825: Data Extraction Process)

The ciphertext data extracting unit 844 extracts a ciphertext data group {CTi'}. The ciphertext data group {CTi'} is a set formed of encrypted tags matching the search query SQ at step S824. This ciphertext data group {CTi'} is referred to as the encrypted search result {C}.

(Step S826: Output Process)

When the encrypted search result {C} is extracted at step S825, by using the communication device 805, the output unit 850 transmits the encrypted search result {C} extracted at step S825 to the search operation device 700.

Otherwise, the output unit 850 may do nothing and end the process in this flowchart or may transmit information indicating that the encrypted search result {C} is absent to the search operation device 700.

Figure 26:
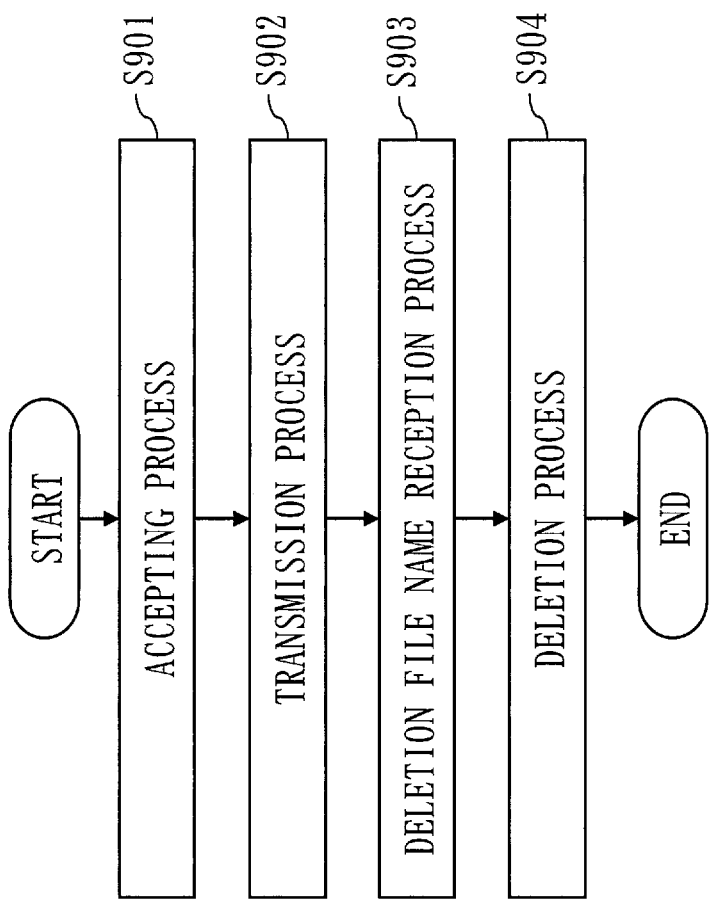
FIG. 26 is a flowchart illustrating operation of a data deletion process in Embodiment 1.

FIG. 26 is a flowchart illustrating one example of operation of a data deletion process.

The data deletion process is a process to be performed by the registration device 600 or the search operation device 700 and the data management device 800.

(Step S901: Accepting Process)

The accepting unit 610 or the accepting unit 710 accepts the name of a file to be deleted as a deletion file name. The deletion file name is obtained by, as a specific example, a search operation process.

When the accepting unit 610 accepts the deletion file name, as a specific example, the accepting unit 610 accepts the deletion file name inputted to the registration device 600 via the input/output interface 604.

When the accepting unit 710 accepts the deletion file name, the accepting unit 710 accepts the deletion file name inputted to the search operation device 700 via the input/output interface 704. The accepting unit 610 or the accepting unit 710 may accept the deletion file name from an application program.

(Step S902: Transmission Process)

If the accepting unit 610 has accepted the deletion file name, the output unit 640 transmits the deletion file name to the data management device 800 by using the communication device 605.

If the accepting unit 710 has accepted the deletion file name, the output unit 750 transmits the deletion file name to the data management device 800 by using the communication device 705.

(Step S903: Deletion File Name Reception Process)

The accepting unit 810 receives the deletion file name from the registration device 600 or the search operation device 700 by using the communication device 805.

(Step S904: Deletion Process)

The accepting unit 810 deletes the encrypted data C, the encrypted tag CT, the encrypted index EI, and the index I corresponding to the deletion file name from the storage unit 891.

Description of Effects of Embodiment 1

As described above, with the searchable encryption system 100 according to the present embodiment, it is possible to achieve a multiuser-type searchable encryption by using common key cryptography without using public key cryptography.

The registration device 600 applies a deterministic one-way function to the encrypted tag before randomized by using a random number to generate an index with a multiuser-type common key scheme. The index is used to check at high speeds, without using searchable encryption, whether there is a possibility that the registration data and the search data match and the attribute information incorporated in the registration data and the attribute information incorporated in the search data match. Note that it is difficult to extract a keyword, information regarding the attribute information, and so forth from this index.

The search operation device 700 generates an index query corresponding to the partially-disclosed index disclosure key by using the user key corresponding to the searcher.

The data management device 800 narrows down encrypted tags as search targets by using the index and the index query. Thus, by using the index, the data management device 800 does not have to perform at least part of a searchable encryption that is unnecessary.

From these, the searchable encryption system 100 can perform a search process in the multiuser-type common key scheme relatively at high speeds.

Also, the registration device 600 divides this index into a plurality of blocks, and encrypts and retains each by using a different key. With the registration device 600 gradually publishing, as required, these keys used in encryption, the speed of process regarding the index can be increased stepwise.

Other Structures

Modification Example 1

At least two devices described in the specification may be formed of one computer.

Modification Example 2

The data management device 800 may not use all published index disclosure keys IK. In the present modification example, the index disclosure position information Pos is formed of only information indicating the position of the index I corresponding to the index disclosure key IK used by the data management device 800.

Modification Example 3

Figure 27:
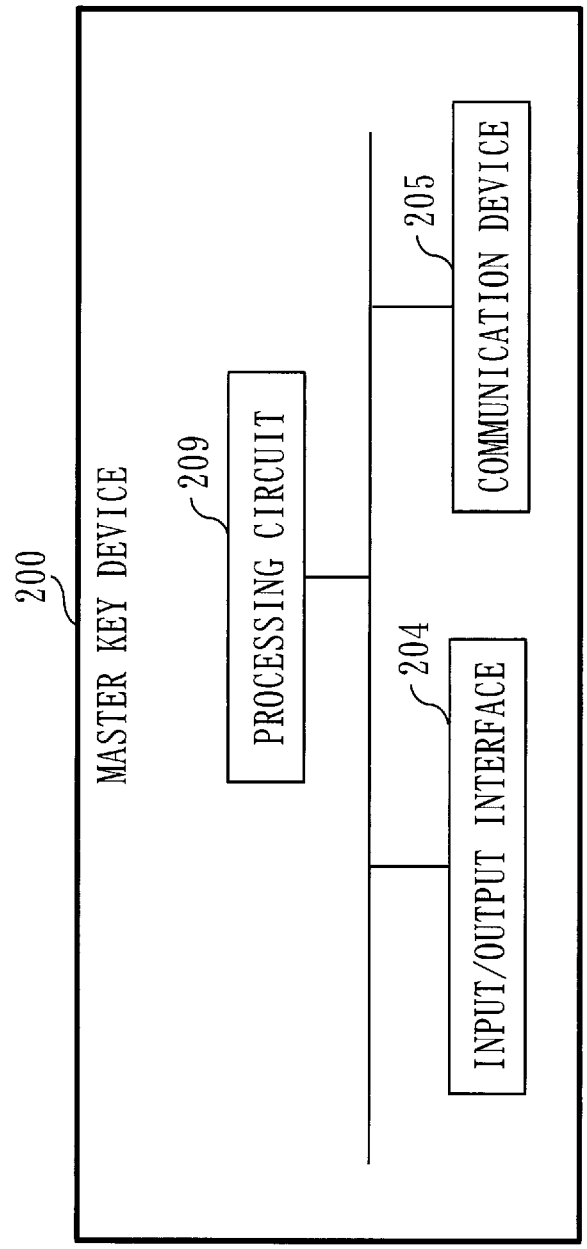
FIG. 27 is a hardware structure diagram of the master key device 200 in a modification example of Embodiment 1.

FIG. 27 illustrates an example of hardware structure of the master key device 200 according to the present modification example.

The master key device 200 includes a processing circuit 209 in place of at least one of the processor 201, the memory 202, and the auxiliary storage device 203.

The processing circuit 209 is hardware implementing at least part of the accepting unit 210, the generation unit 220, the output unit 230, and the storage unit 291.

The processing circuit 209 may be dedicated hardware, and may be the processor 201 which executes a program stored in the memory 202.

When the processing circuit 209 is dedicated hardware, the processing circuit 209 is, for example, a single circuit, composite circuit, programmed processor, parallel-programmed processor, ASIC (ASIC is Application Specific Integrated Circuit), FPGA (Field Programmable Gate Array), or a combination of these.

The master key device 200 may include a plurality of processing circuits which replace the processing circuit 209. The plurality of processing circuits share the role of the processing circuit 209.

In the master key device 200, part of the functions may be implemented by dedicated hardware and the remaining functions may be implemented by software or firmware.

The processing circuit 209 is implemented by hardware, software, firmware, or a combination of these.

The processor 201, the memory 202, the auxiliary storage device 203, and the processing circuit 209 are collectively referred to as "processing circuitry". That is, the function of each functional component of the master key device 200 is implemented by processing circuitry.

Modification Example 4

Figure 28:
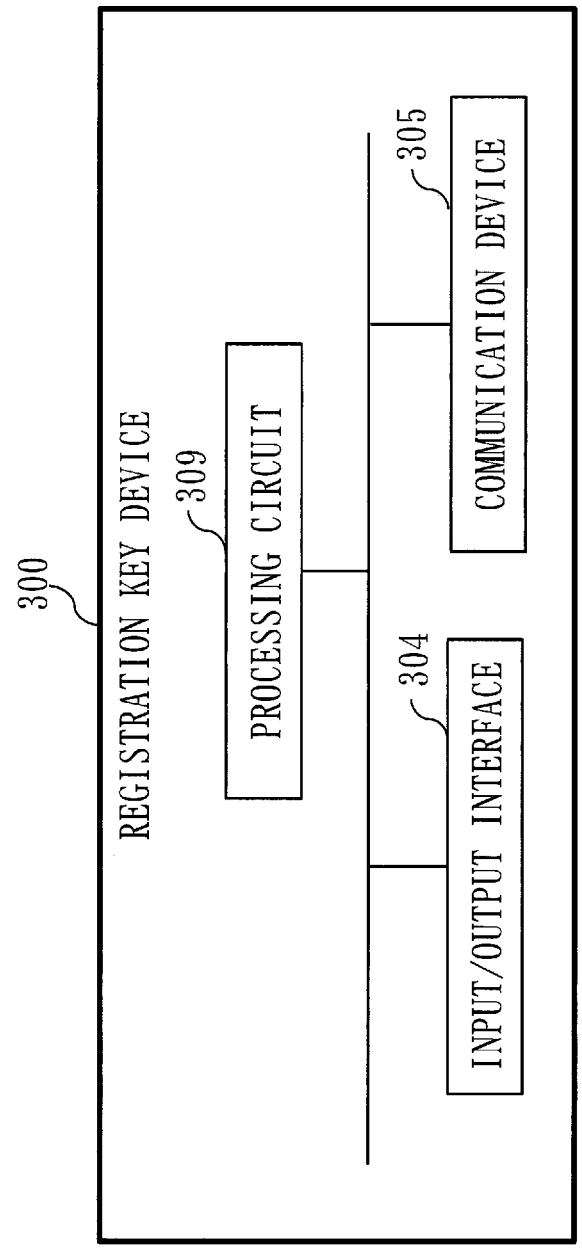
FIG. 28 is a hardware structure diagram of the registration key device 300 in the modification example of Embodiment 1.

FIG. 28 illustrates an example of hardware structure of the registration key device 300 according to the present modification example.

The registration key device 300 includes a processing circuit 309 in place of at least one of the processor 301, the memory 302, and the auxiliary storage device 303. The processing circuit 309 is equivalent to the processing circuit 209.

The processing circuit 309 is hardware implementing at least part of the accepting unit 310, the generation unit 320, the output unit 330, and the storage unit 391.

The function of each functional component of the registration key device 300 is implemented by processing circuitry.

Modification Example 5

Figure 29:
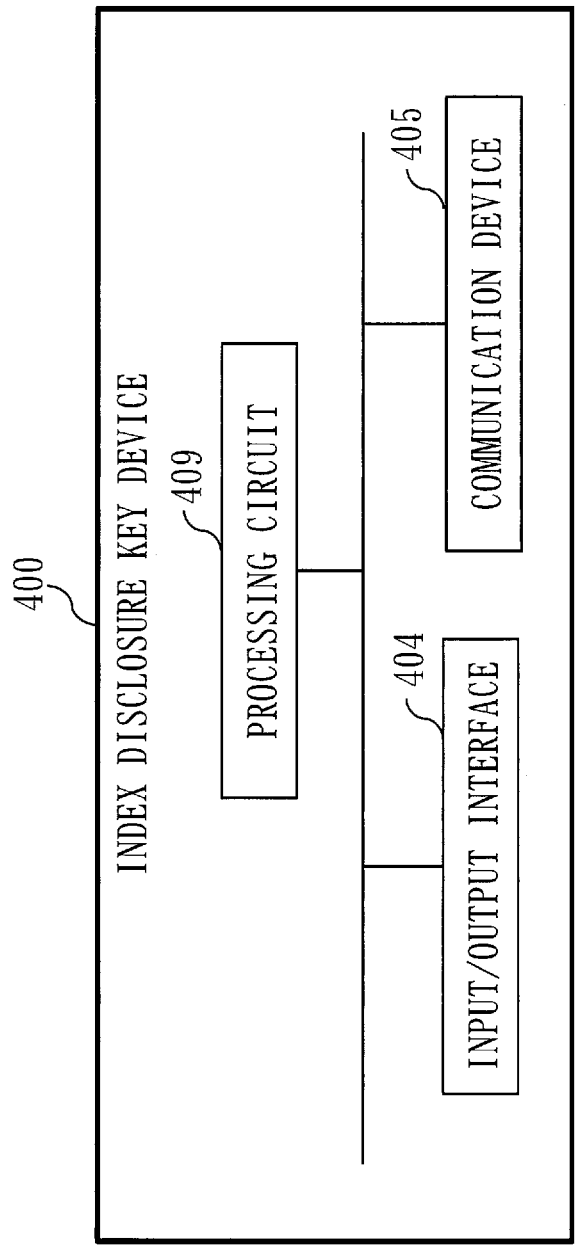
FIG. 29 is a hardware structure diagram of the index disclosure key device 400 in the modification example of Embodiment 1.

FIG. 29 illustrates an example of hardware structure of the index disclosure key device 400 according to the present modification example.

The index disclosure key device 400 includes a processing circuit 409 in place of at least one of the processor 401, the memory 402, and the auxiliary storage device 403. The processing circuit 409 is equivalent to the processing circuit 209.

The processing circuit 409 is hardware implementing at least part of the accepting unit 410, the generation unit 420, the output unit 430, and the storage unit 491.

The function of each functional component of the index disclosure key device 400 is implemented by processing circuitry.

Modification Example 6

Figure 30:
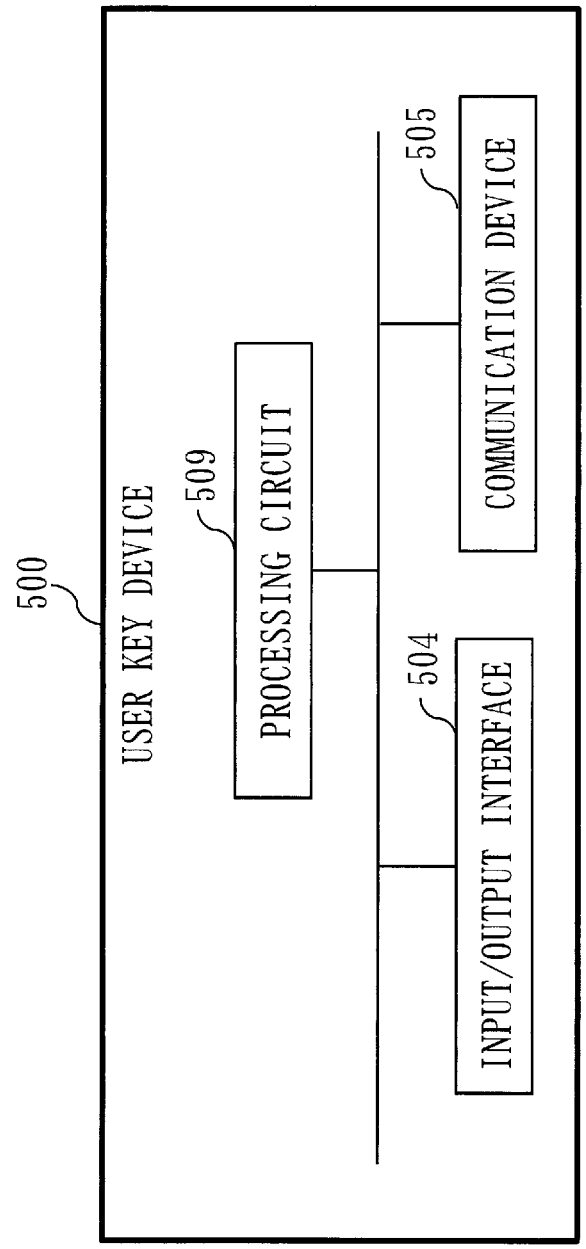
FIG. 30 is a hardware structure diagram of the user key device 500 in the modification example of Embodiment 1.

FIG. 30 illustrates an example of hardware structure of the user key device 500 according to the present modification example.

The user key device 500 includes a processing circuit 509 in place of at least one of the processor 501, the memory 502, and the auxiliary storage device 503. The processing circuit 509 is equivalent to the processing circuit 209.

The processing circuit 509 is hardware implementing the accepting unit 510, the generation unit 520, the output unit 530, and the storage unit 591.

The function of each functional component of the user key device 500 is implemented by processing circuitry.

Modification Example 7

Figure 31:
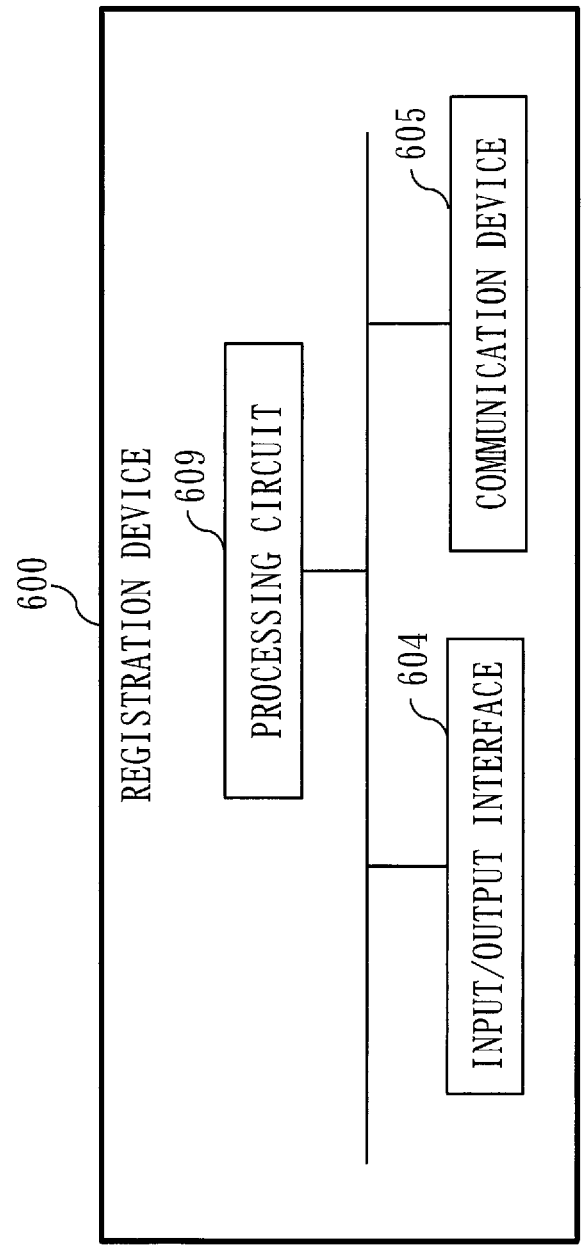
FIG. 31 is a hardware structure diagram of the registration device 600 in the modification example of Embodiment 1.

FIG. 31 illustrates an example of hardware structure of the registration device 600 according to the present modification example.

The registration device 600 includes a processing circuit 609 in place of at least one of the processor 601, the memory 602, and the auxiliary storage device 603. The processing circuit 609 is equivalent to the processing circuit 209.

The processing circuit 609 is hardware implementing at least part of the accepting unit 610, the generation unit 620, the registration unit 630, the output unit 640, and the storage unit 691.

The function of each functional component of the registration device 600 is implemented by processing circuitry.

Modification Example 8

Figure 32:
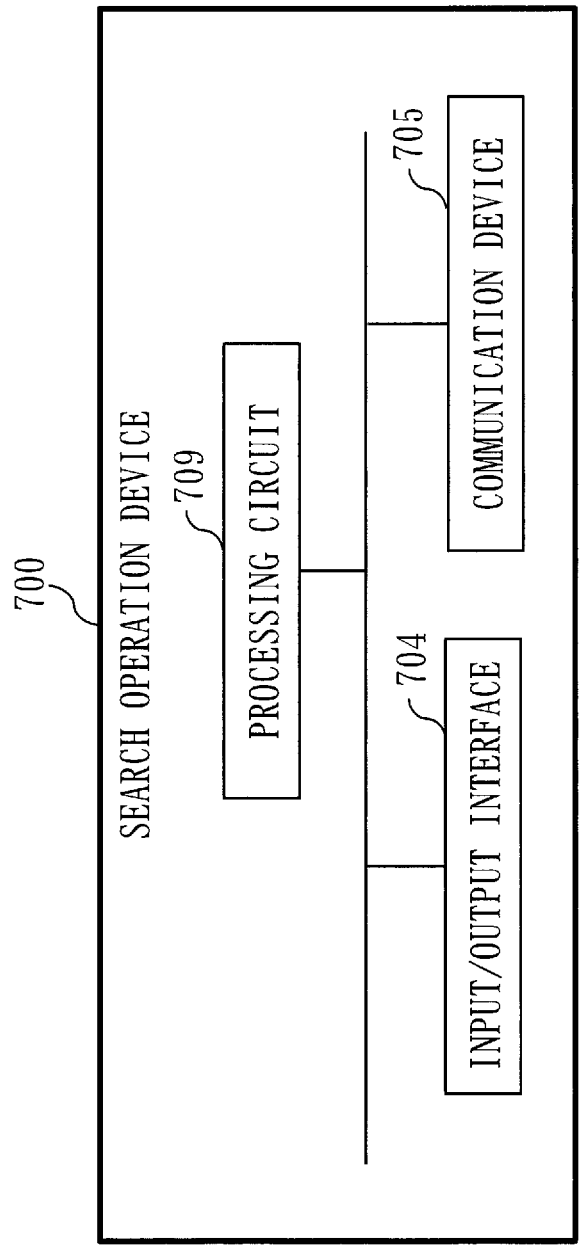
FIG. 32 is a hardware structure diagram of the search operation device 700 in the modification example of Embodiment 1.

FIG. 32 illustrates an example of hardware structure of the search operation device 700 according to the present modification example.

The search operation device 700 includes a processing circuit 709 in place of at least one of the processor 701, the memory 702, and the auxiliary storage device 703. The processing circuit 709 is equivalent to the processing circuit 209.

The processing circuit 709 is hardware implementing at least part of the accepting unit 710, the generation unit 720, the requesting unit 730, the decoding unit 740, the output unit 750, and the storage unit 791.

The function of each functional component of the search operation device 700 is implemented by processing circuitry.

Modification Example 9

Figure 33:
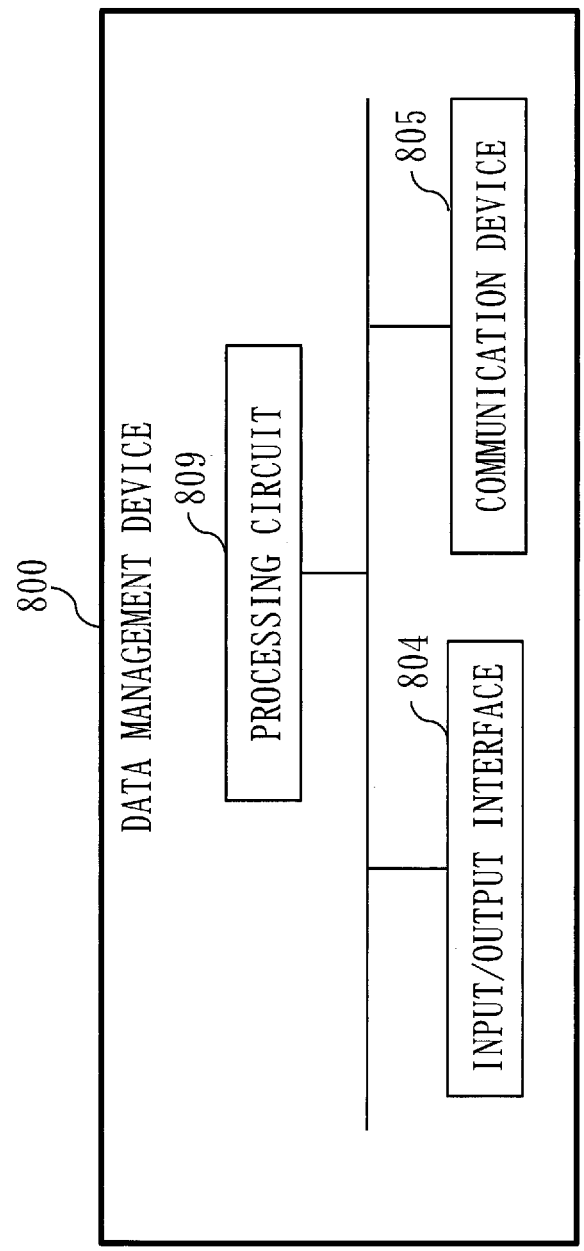
FIG. 33 is a hardware structure diagram of the data management device 800 in the modification example of Embodiment 1.

FIG. 33 illustrates an example of hardware structure of the data management device 800 according to the present modification example.

The data management device 800 includes a processing circuit 809 in place of at least one of the processor 801, the memory 802, and the auxiliary storage device 803. The processing circuit 809 is equivalent to the processing circuit 209.

The processing circuit 809 is hardware implementing at least part of the accepting unit 810, the decoding unit 820, the registration unit 830, the searching unit 840, the output unit 850, and the storage unit 891.

The function of each functional component of the data management device 800 is implemented by processing circuitry.

Other Embodiments

While Embodiment 1 has been described, a plurality of portions of the present embodiment may be combined for implementation. Alternatively, one portion of the present embodiment may be implemented. Other than that, the present embodiment may be variously changed as required and may be, as a whole or partially, implemented as being combined in any manner.

Note that the above-described embodiment is an intrinsically preferable example and is not intended to limit the present disclosure, its applications, and the range of purposes. The procedures described by using flowcharts and so forth may be changed as appropriate.

REFERENCE SIGNS LIST

100: searchable encryption system; 101: network; 200: master key device; 201: processor; 202: memory; 203: auxiliary storage device; 204: input/output interface; 205: communication device; 209: processing circuit; 210: accepting unit; 220: generation unit; 230: output unit; 291: storage unit; 300: registration key device; 301: processor; 302: memory; 303: auxiliary storage device; 304: input/output interface; 305: communication device; 309: processing circuit; 310: accepting unit; 320: generation unit; 330: output unit; 391: storage unit; 400: index disclosure key device; 401: processor; 402: memory; 403: auxiliary storage device; 404: input/output interface; 405: communication device; 409: processing circuit; 410: accepting unit; 420: generation unit; 421: index disclosure key generation unit; 430: output unit; 491: storage unit; 500: user key device; 501: processor; 502: memory; 503: auxiliary storage device; 504: input/output interface; 505: communication device; 509: processing circuit; 510: accepting unit; 520: generation unit; 521: user key generation unit; 530: output unit; 591: storage unit; 600: registration device; 601: processor; 602: memory; 603: auxiliary storage device; 604: input/output interface; 605: communication device; 609: processing circuit; 610: accepting unit; 620: generation unit; 621: ciphertext data generation unit; 622: keyword generation unit; 623: middle tag generation unit; 624: index generation unit; 625: encrypted index generation unit; 626: random number generation unit; 627: encrypted tag generation unit; 630: registration unit; 640: output unit; 691: storage unit; 700: search operation device; 701: processor; 702: memory; 703: auxiliary storage device; 704: input/output interface; 705: communication device; 709: processing circuit; 710: accepting unit; 720: generation unit; 721: search query generation unit; 722: index query generation unit; 730: requesting unit; 740: decoding unit; 750: output unit; 791: storage unit; 800: data management device; 801: processor; 802: memory; 803: auxiliary storage device; 804: input/output interface; 805: communication device; 809: processing circuit; 810: accepting unit; 820: decoding unit; 821: encrypted index decoding unit; 830: registration unit; 840: searching unit; 841: index collating unit; 842: encrypted tag extracting unit; 843: encrypted tag collating unit; 844: ciphertext data extracting unit; 850: output unit; 891: storage unit; 892: registration database; 893: post-index-disclosure database; CT: encrypted tag; DK: data key; EK: registration key; EI: encrypted index; I: index; IK: index disclosure key; ILEN: index length; IQ: index query; IQ': partial index query; M: plaintext; MK: master key; MT: middle tag; Pos: index disclosure position information; SQ: search query; TK: tag key; TR: random number; UDK: user data key; UK: user key; UTK: user tag key; w: search keyword; W: registration keyword

The invention claimed is:

1. A searchable encryption system comprising:
   a registration device including:
      processing circuitry
      to store a registration keyword, authorized-person attribute information indicating an attribute to be owned by an authorized person who has an authority to search for the registration keyword, and an index disclosure key to encrypt a registration keyword index corresponding to the registration keyword;
      to generate the registration keyword index by using the registration keyword, the authorized-person attribute information, a user key function to generate a user key having incorporated therein searcher attribute information indicating an attribute that a searcher who searches for the registration keyword has, a search query function to generate a search query having the user key incorporated therein, the search query corresponding to a search keyword for the searcher to search for the registration keyword, and an index query function to generate an index query having the search query incorporated therein, the index query being for searching for the registration keyword index; and
      to generate an encrypted index by encrypting the registration keyword index by using the index disclosure key.

2. The searchable encryption system according to claim 1, wherein
   the processing circuitry of the registration device generates a random number as an encrypted tag random number, generates a middle tag corresponding to the registration keyword by using the authorized-person attribute information, the registration keyword, the user key function, and the search query function, and generates an encrypted tag having the registration keyword incorporated therein, by using the middle tag, the encrypted tag random number, and an encrypted tag function to generate the encrypted tag, and
   the processing circuitry of the registration device generates the registration keyword index by using the middle tag.

3. The searchable encryption system according to claim 2, comprising:
   a data management device including:
      processing circuitry
      to have the search query stored therein; and
      to accept the encrypted tag and to cause the encrypted tag to be stored in the management data storage unit, wherein
      by using the registration keyword, the encrypted tag random number, the encrypted tag function, and a collator function to generate an encrypted tag collator corresponding to the encrypted tag, the processing circuitry of the registration device generates the encrypted tag collator and couples the encrypted tag random number and the encrypted tag collator to the encrypted tag,
   the processing circuitry of the registration device outputs the encrypted tag to the data management device, and
   the processing circuitry of the data management device performs a collating process of generating, by using the encrypted tag, the search query, the encrypted tag random number coupled to the encrypted tag, the encrypted tag function, and the collator function, a determination-purpose collator for determining whether the search keyword matches the registration keyword and, when the determination-purpose collator and the encrypted tag collator coupled to the encrypted tag are equal, determining that the registration keyword and the search keyword match.

4. The searchable encryption system according to claim 3, wherein
   the index disclosure key is a key capable of decoding at least part of the encrypted index,
   the data management device has the index disclosure key and the index query stored therein,
   the processing circuitry of the registration device outputs the encrypted index to the data management device,
   the processing circuitry of the data management device accepts the encrypted index and causes the encrypted index to be stored in the data management device,
   the processing circuitry of the data management device generates a partial registration keyword index, which is at least part of the registration keyword index, by decoding the encrypted index by using the index disclosure key, and determines, when a partial index query and the partial registration keyword index match, the partial index query being included in the index query and corresponding to the partial registration keyword index, that there is a possibility that the registration keyword and the search keyword match and the authorized-person attribute information and the searcher attribute information match, and
   the processing circuitry of the data management device performs the collating process when the index collating unit determines that there is the possibility that the registration keyword and the search keyword match and the authorized-person attribute information and the searcher attribute information match.

5. The searchable encryption system according to claim 4, wherein
   the data management device has stored therein index disclosure position information indicating a position corresponding to the at least part of the encrypted index, and
   the processing circuitry of the data management device takes a portion corresponding to the index disclosure position information in the index query as the partial index query.

6. The searchable encryption system according to claim 4, comprising:
   a search operation device including:
      processing circuitry
      to have the user key and the search keyword stored therein;
      to generate the search query by using the user key, the search keyword, and the search query function;
      to generate the index query by using the search query and the index query function; and
      to output the search query and the index query to the data management device, wherein
   the processing circuitry of the data management device accepts the search query and the index query and causes the search query and the index query to be stored in the data management device.

7. The searchable encryption system according to claim 5, comprising:
   a search operation device including:
      processing circuitry
      to have the user key and the search keyword stored therein;
      to generate the search query by using the user key, the search keyword, and the search query function;

to generate the index query by using the search query and the index query function; and to output the search query and the index query to the data management device, wherein the processing circuitry of the data management device accepts the search query and the index query and causes the search query and the index query to be stored in the data management device.

8. The searchable encryption system according to claim 6, comprising:

a user key device including:
processing circuitry
to have the searcher attribute information stored therein;
to generate the user key by using the searcher attribute information and the user key function; and
to output the user key to the search operation device, wherein the processing circuitry of the search operation device accepts the user key and to cause the user key to be stored in the search operation device.

9. The searchable encryption system according to claim 7, comprising:

a user key device including:
processing circuitry
to have the searcher attribute information stored therein;
to generate the user key by using the searcher attribute information and the user key function; and
to output the user key to the search operation device, wherein the processing circuitry of the search operation device accepts the user key and to cause the user key to be stored in the search operation device.

10. The searchable encryption system according to claim 2, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

11. The searchable encryption system according to claim 3, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

12. The searchable encryption system according to claim 4, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

13. The searchable encryption system according to claim 5, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

14. The searchable encryption system according to claim 6, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

15. The searchable encryption system according to claim 7, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

16. The searchable encryption system according to claim 8, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

17. The searchable encryption system according to claim 9, wherein the authorized-person attribute information includes a wildcard indicating that a searcher corresponding to the searcher attribute information is permitted to search for the registration keyword irrespective of what the attribute included in the searcher attribute information is like, and the processing circuitry of the registration device incorporates the wildcard into the middle tag.

18. A searchable encryption method, wherein a registration device being a computer has stored therein a registration keyword, authorized-person attribute information indicating an attribute to be owned by an authorized person who has an authority to search for the registration keyword, and an index disclosure key to encrypt a registration keyword index corresponding to the registration keyword, the registration device generates the registration keyword index by using the registration keyword, the authorized-person attribute information, a user key function to generate a user key having incorporated therein searcher attribute information indicating an attribute that a searcher who searches for the registration keyword has, a search query function to generate a search query having the user key incorporated therein, the search query corresponding to a search keyword for the searcher to search for the registration keyword, and an index query function to generate an index query having the search query incorporated therein, the index query searching for the registration keyword index, and the registration device generates an encrypted index by encrypting the registration keyword index by using the index disclosure key.

19. A non-transitory computer-readable recording medium recorded with a searchable encryption program that causes a computer having stored therein a registration keyword, authorized-person attribute information indicating an attribute to be owned by an authorized person who has an authority to search for the registration keyword, and an index disclosure key to encrypt a registration keyword index corresponding to the registration keyword to:

generate the registration keyword index by using the registration keyword, the authorized-person attribute information, a user key function to generate a user key having incorporated therein searcher attribute information indicating an attribute that a searcher who searches for the registration keyword has, a search query function to generate a search query having the user key incorporated therein, the search query corresponding to a search keyword for the searcher to search for the registration keyword, and an index query function to generate an index query having the search query incorporated therein, the index query being for searching for the registration keyword index; and generate an encrypted index by encrypting the registration keyword index by using the index disclosure key.

* * * * *